United States Patent [19]
Wichmann

[11] Patent Number: 5,857,255
[45] Date of Patent: Jan. 12, 1999

[54] APPARATUS AND METHOD FOR PRODUCING A METALLIC TUBE FOR LIGHT WAVEGUIDES

[75] Inventor: Franz-Josef Wichmann, Friesoythe, Germany

[73] Assignee: Siemens Aktiengesellschaft, Munich, Germany

[21] Appl. No.: 748,800

[22] Filed: Nov. 14, 1996

[30] Foreign Application Priority Data

| Nov. 16, 1995 | [DE] | Germany | 195 42 821.8 |
| Nov. 16, 1995 | [DE] | Germany | 195 42 819.6 |
| Sep. 19, 1996 | [DE] | Germany | 196 38 403.6 |

[51] Int. Cl.⁶ .............................. B23K 9/00; B23K 31/00; B21D 39/04
[52] U.S. Cl. .............................. 29/458; 228/148; 29/447; 29/17.5
[58] Field of Search .................. 29/458, 469.5, 29/447; 228/17.5, 148

[56] References Cited

U.S. PATENT DOCUMENTS

| 5,072,870 | 12/1991 | Ziemek . | |
| 5,238,172 | 8/1993 | Le Davay | 228/17.5 |
| 5,418,877 | 5/1995 | Oestreich . | |
| 5,582,748 | 12/1996 | Yoshie et al. | 228/148 |

FOREIGN PATENT DOCUMENTS

| 40 03 311 | 8/1991 | Germany . |
| 42 10 633 | 4/1995 | Germany . |

Primary Examiner—Andrea L. Pitts
Assistant Examiner—Tisa L. Stewart
Attorney, Agent, or Firm—Hill & Simpson

[57] ABSTRACT

A method and apparatus for manufacturing a metallic tube having at least one light waveguide, wherein the tube is rolled for cross sectional shaping after welding of the edges of the band forming the tube.

23 Claims, 13 Drawing Sheets

APPARATUS AND METHOD FOR PRODUCING A METALLIC TUBE FOR LIGHT WAVEGUIDES

BACKGROUND OF THE INVENTION

The invention is directed to a method and apparatus for producing a metallic tube, which is equipped with at least one light waveguide.

Optical transmission elements, whose light waveguides are surrounded by a metallic cladding, are employed in cable technology, for example for high-voltage overhead lines or submarine cables. As warranted, the light waveguides can be additionally embedded into a filling compound in the inside of a metallic cladding or tube. In particular, the metallic cladding or tube serves the purpose of protecting the light waveguides against chemical, mechanical stresses and/or other disturbing influences, such as, for example, ambient moisture or hydrogen diffusion. For manufacturing such an optical transmission element, a metal band is shaped into a tube, and at least one light waveguide with or without the filling compound is introduced into the tube and the tube is then welded.

In practice, the manufacture of such a metal tube equipped with a light waveguide can be made more complicated for various reasons.

For example, difficulties can occur, particularly when welding the metallic tube. There is the risk, for example, that an admissibly high thermal stressing and, thus, damage to the materials or even a partial burning of the filling compound and/or of the plastic coating of the light waveguide will occur. In addition, the welding process is also particularly critical because hydrogen can be released due to local overheating. Such hydrogen can be released, for example, from humid ambient air during the melting of the edges of the tube to form the weld, or from the filling compound or from the plastic coating of the light waveguide, etc. If such hydrogen is entrained under certain conditions into the inside of a completely welded tube, which is tight on all sides, the hydrogen will remain in the tube and lead to an undesirable increase in the transmission attenuation of the light waveguides.

In U.S. Pat. No. 5,072,870, whose disclosure is incorporated herein by reference thereto and which claims priority from German Application 40 03 311, a metal band is already reversibly lengthened to form a tube before or during its shaping. To that end, the metal band is already heated with the assistance of a heating device before its actual shaping process. The optical fibers are introduced into the slotted tube in the region of the lengthened, slotted tube section being formed, to move together with the tube. Subsequently, the previously lengthened slotted tube is mechanically closed, is longitudinally welded with the assistance of a welding means and, finally, is pulled through a gauge plate for reducing the cross section of the tube. A clamping jaw haul-off serves the purpose of pulling the tube through the device. The tube is then subsequently strain-relieved and supplied to a supply reel. Problems can particularly occur in such a method in that the metal band is reversibly lengthened before the actual shaping event and must then traverse a number of shaping stages, such as, for example, roller tools, a welding means as well as a gauge plate until the shaping for the tube to be fabricated is ultimately completed. In particular, these subsequent shaping steps give rise to the risk that the previously set lengthening of the metal band is charged with disturbing quantities in an uncontrolled way or is partially or, eventually, potentially even entirely lost again. An exact setting of the excess length of the optical fibers compared to the metal tube is thus rendered more difficult in practice.

SUMMARY OF THE INVENTION

An object of the present invention is to provide a way for a metallic tube to be equipped with at least one light waveguide that can be done in a faultless manufacturing process. This is obtained by an improvement in the method for manufacturing metallic tubes equipped with at least one light waveguide, wherein a band is rolled into a shape of the tube and the edges are brought together, the waveguide is inserted into the tube and then welding the edges of the band together to complete the forming of the tube. The improvement is that the tube is rolled for cross sectional shaping after the welding of the band edges together, which method makes it possible to manufacture the metallic tubes in a reliable way.

The invention is also directed to an apparatus for manufacturing a metallic tube which is equipped with at least one light waveguide, and this apparatus is characterized in that rolling means are provided, with which the tube is rolled to a prescribed cross sectional geometry following the processing equipment including the means for welding the edges of the tube together.

The invention is also directed to a method for producing excess lengths of at least one light waveguide compared to the length of the metal tube which surrounds it, wherein the metal band is shaped into a tube along a shaping section, and wherein the production of an excess length of the waveguide is obtained by reversible lengthening of the metal tape. The improvement is that the light waveguides are only introduced into the completely shaped tube when it leaves the shaping section and in that the completely shaped tube is not heated and reversibly stretched until leaving the shaping section, and is then heated and reversibly or elastically stretched in an immediately following lengthening section and, finally, the tube is cooled and relieved so that, after leaving the lengthening section, it is shortened and the light waveguides come to lie in the shortened metallic tube with a defined excess length.

The invention is also directed to an apparatus for the implementation of this method, which is characterized in that a shaping device is provided that shapes a metal band into a tube along a shaping section, means are allocated to the output of the shaping device that only introduces the light waveguides into the completely shaped tube at or following the departure thereof from the shaping device, that the shaping device is immediately followed by a lengthening device that only heats and reversibly stretches the finished tube upon departure from the shaping device and immediately following the lengthening device the apparatus includes relaxation means which involves finally cooling and relieving the tube after departure from the lengthening region so that the tube is shortened and the light waveguide in the tube comes to lie in a shortened metallic tube with a defined excess length.

The invention is also directed to an apparatus for the manufacture of a metallic tube into which at least one light waveguide can be introduced, upon employment of a shaping mechanism that shapes an elongated metal band into a tube as well as a welding mechanism that welds the two edges of the band to one another in a welding region to form the tube. The improvement is that at least one cooled, solid member contacts the outside of the tube traversing the haul-off direction for cooling and is provided in the welding region.

The invention is also directed to the method for manufacturing a metallic tube into which at least one light waveguide is introduced, wherein the tube is pre-shaped from an elongated metal band and the edges of the band are welded to one another in a welding region to form the tube. The improvement comprises the tube traversing in the haul-off direction being externally contacted in the welding region by at least one solid cooling body.

The invention is also directed to an apparatus for the manufacture of a metallic tube in which at least one light waveguide can be introduced upon the employment of a shaping device that shapes an elongated metal band to form the tube, as well as a welding device that will weld the two band edges together to form a tube in a welding region, which has the improvement that means that press the tube edges flat against each other in the welding region are preceding the actual welding point for the welding region.

The invention is also directed to the method for manufacturing a metallic tube in which at least one light waveguide is introduced, wherein the method includes a tube being preshaped from an elongated metal band and having the two edges brought together and welded together to form the tube in a welding region, which has the improvement that the tube is pressed flat in the region of the band edges before the actual welding point of the welding region.

The invention is also directed to an apparatus for generating excess lengths of at least one light waveguide compared to the metallic tube which surrounds it upon employment of an upsetting device for the plastic, axial shortening of the metallic tube conducted through the device, with the improvement being characterized in that the upsetting mechanism comprises rollers along a predescribed upsetting path that roll off on both sides of the outside circumference of the elongated extent of the tube passing therethrough and support the tube from the outside so that a radial escape from its axial conveying direction along the upsetting path is largely avoided.

The invention is also directed to a method of producing excess lengths of at least one light waveguide compared to a metallic tube which surrounds it, wherein the metal tube is plastically shortened in an axial direction along a prescribed upsetting path, with the improvement being that the tube is supported from the outside by rollers at both sides of its longitudinal extent along a prescribable upsetting path so that the radial escape from its axial conveying direction is largely avoided along the upsetting path.

The invention is also directed to a method for producing excess lengths of at least one light waveguide compared to the metal tube surrounding the waveguide, wherein the metal band is shaped into a tube along a shaping section and wherein the production of excess length is effected by reversible lengthening of the metal band.

The invention is based on the object of producing an excess length of at least one light waveguide prescribable in a defined fashion relative to the metal tube, which surrounds the waveguide, in a reliable and precisely controlled way. In a method of the known type, which includes shaping a band into a tube, welding the edges of the band together to complete the tube and introducing a light waveguide, the improvements are that the light waveguide is not introduced into the completely shaped tube until the departure of the tube from the shaping section, that the finished tube is not heated and reversibly stretched until after the departure from the shaping section in a lengthening section immediately following the shaping section, the tube is then cooled and relaxed so that after departure from the lengthening section, the tube is shortened and the light waveguides come to lie in a shortened metallic tube with a defined excess length. An especially effective production of the excess length of the light waveguide or light waveguides is enabled in that the metal tube is reversibly or elastically stretched only after the completion of its shaping and not before the shaping.

The invention is also directed to the apparatus for implementing the inventive method, which includes the improvement that the shaping device is provided that shapes the metal band into a tube along a shaping section, means are arranged at the output of the shaping device that introduce the light waveguide into a completely shaped tube only after departure of the tube from the shaping device, and that the shaping device is immediately followed by a lengthening device that heats and elastically stretches the finished tube upon departure of the tube from the shaping device and that the lengthening device is followed by a relaxation means that finally cools and relaxes the tube after departure from the lengthening region so that the tube is shortened and the light waveguides come to lie in a shortened metallic tube with a defined excess length.

Other advantages and features of the invention will be readily apparent from the following description of the preferred embodiments, the drawings and claims.

DESCRIPTION OF THE PREFERRED EMBODIMENTS

Figure 1:
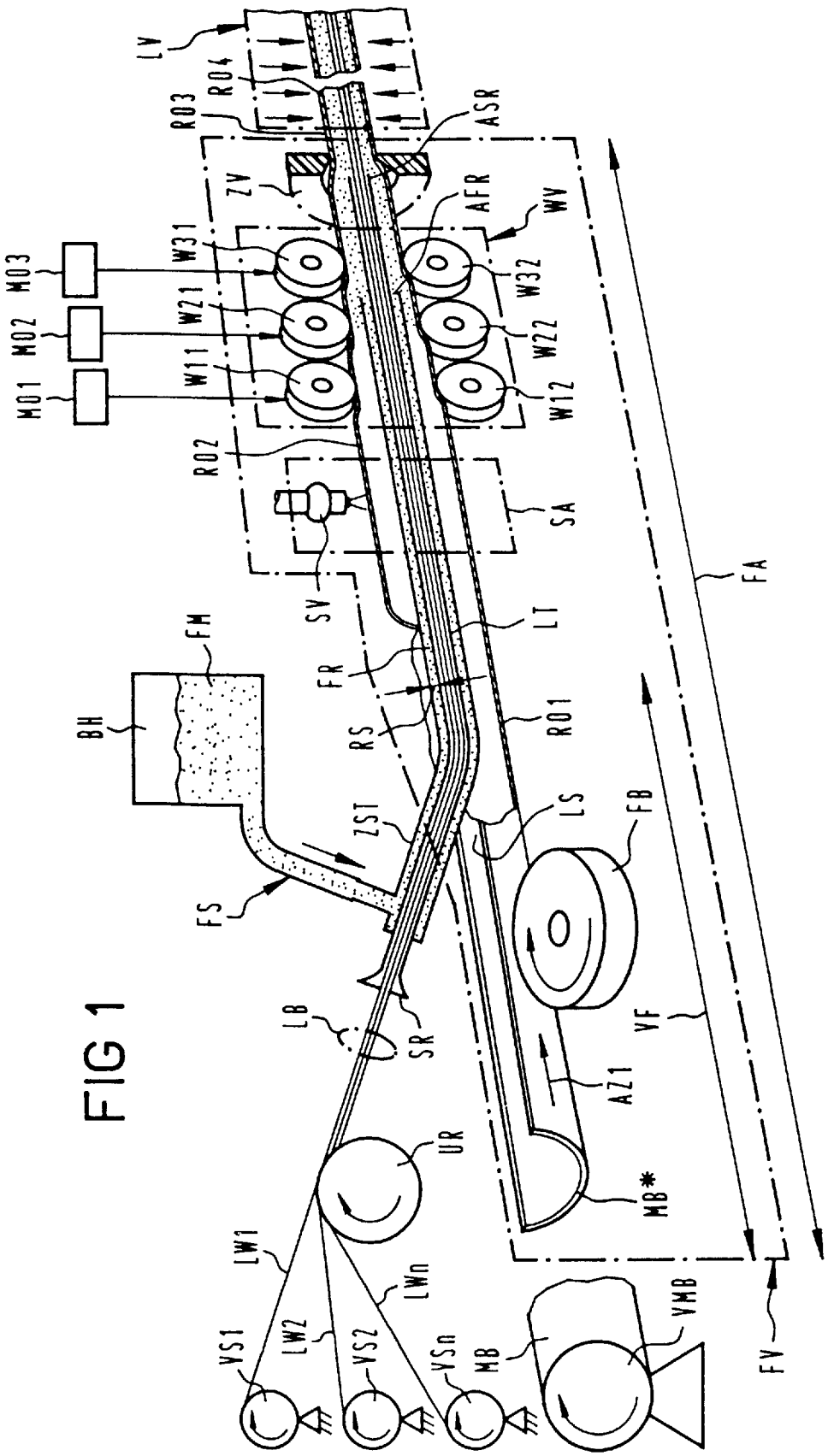
FIG. 1 is an elongated schematic view of a first sub-section of a production line for the implementation of the method according to the present invention.
Figure 2:
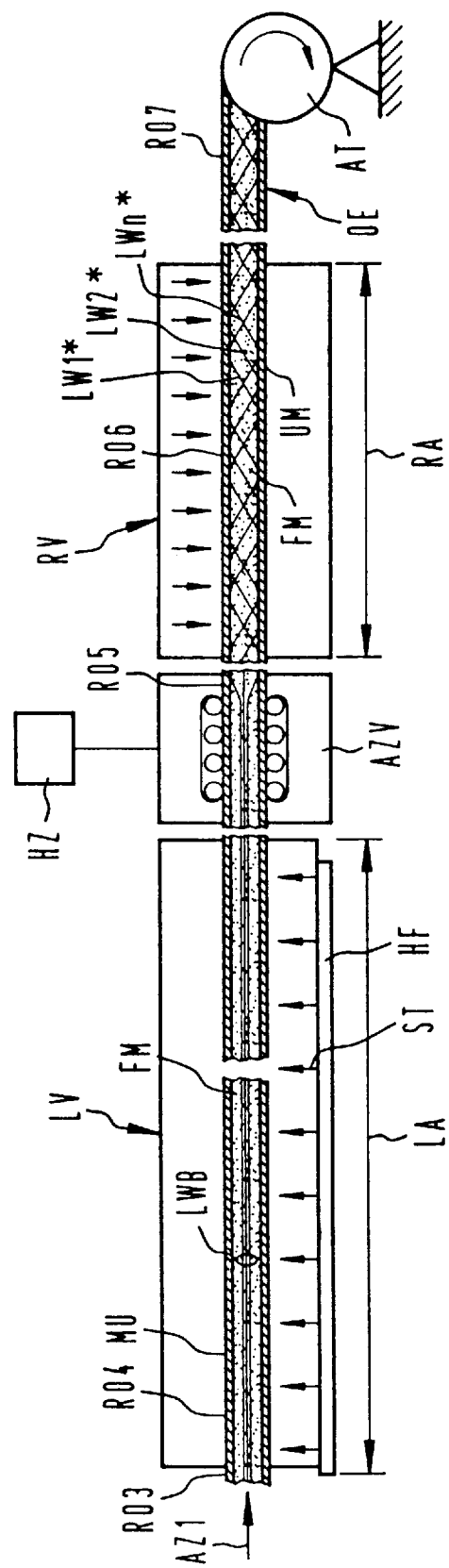
FIG. 2 is an elongated schematic view of the remaining or second sub-section of the production line started in FIG. 1 for preforming the method of the present invention.

The principles of the present invention are particularly useful when incorporated in an apparatus illustrated in FIGS. 1 and 2 for fabricating a metal tube that is equipped with at least one light waveguide and preferably wherein the light waveguides are embedded in a filling compound inside of the tube so that a finished optical transmission element is formed by a closed metallic cladding or tube, which contains at least one light waveguide and/or a filling compound.

In the left half of the illustration of FIG. 1, a metal band MB that is first preferably plain-faced such as, for example, a steel, stainless steel, copper, aluminum band or the like is hauled-off from a stationary supply reel VMB. With the assistance of a following shaping means FV, which is indicated as a frame with dot-dash lines in FIG. 1, this metal band MB is continuously shaped to form a metallic tube having a prescribable cross sectional form. In particular, it is shaped so that it is cylindrically, particularly approximately circular-cylindrically fashioned in the final condition. The metal band MB is thereby conveyed forward in the shaping device FV on an essentially straight line in the haul-off direction AZ1 along the shaping section FA thereof.

For a better illustration of the continuously proceeding shaping process of the originally plain-faced or flat metal band MB in a cylindrical, particularly circular-cylindrical tube RO3 closed on all sides at the output of the shaping section FA, the metal band is additionally entered in perspective in an intermediate condition, i.e. in a preliminary stage, being schematically shown as a half-cylinder and referenced MB*. This first pre-shaping can be implemented along a pre-shaping section VF of the input side, expediently, for example, with the assistance of appropriately fashioned pre-shaping rollers that press against the metal band MB from the outside and bend this over in the desired way. For the sake of clarity in the drawing, only a single shaping roller FB is schematically entered in FIG. 1, this standing for further, corresponding shaping tools. Expediently, the shaping roller FB, which has been omitted from FIG. 1 for clarity, has a second shaping roller allocated to it at the opposite side of the half-cylindrically pre-shaped metal band MB*, and this second shaping roller serves as an abutment for the shaping roller FB and is fashioned corresponding to the rotating roller FB. A plurality of such pairs of shaping rollers, with each pair having a shaping roller at both sides of the longitudinal extent of the metal band MB, are preferably arranged following one another in longitudinal direction. The metal band MB can be pre-shaped to form a tube RO1 in this way, and this tube RO1 still initially comprising a longitudinal slot LS which extends in the haul-off direction AZ1 to form a longitudinally slotted tube RO1. Expediently, the longitudinally slotted tube RO1 is circular-cylindrically pre-shaped in a first approximation. The longitudinal slot LS thereby proceeds largely on a straight line in a longitudinal direction. The two band edges BK1 and BK2 (FIG. 4) of the metal band MB reside spaced opposite one another along this longitudinal slot LS. In FIG. 1, the longitudinal slot LS proceeds essentially along the middle axis on the upper side of the tube or metallic cladding RO1.

Simultaneously with the shaping process of the metal tape MB, light waveguides LW1 through LWn are unreeled from rotatingly driven supply reels or suppliers VS1 through VSn. These light waveguides LW1–LWn are placed along at least a sub-section of the outside circumference of a rotatingly driven running wheel UR, and are placed side-by-side essentially parallel as well as in a common attitudinal plane. This running wheel UR follows the supply reels VS1 through VSn. With the assistance of such a delivery/conveyor means, the light waveguides LW1–LWn can be advantageously combined to form a sorted or ordered bundle LB within which the individual light waveguides LW1–LWn comprise essentially the same haul-off speed. The light waveguide bundle LB is indicated with the assistance of a dot-dash framing in FIG. 1. The light waveguides LW1–LWn, in particular, are loosely combined, i.e. lying individually next to one another, to form the light waveguide bundle LB. The supply reels VS1–VSn as well as the running wheel UR are driven so that, in particular, a potentially decelerating influence on the conveying motion of the light waveguides LW1–LWn due to the bearing friction of their suspensions is optimally canceled and largely avoided. The drives for the supply reels VS1–VSn as well as the drive for the running wheel UR are preferably matched to one another so that the light waveguides LW1–LWn can be unreeled from their supply reels VS1–VSn and conveyed forward optimally without tensile stress and, therefore, as loosely as possible.

The light waveguides LW1–LWn of the bundle LB, which waveguides are preferably arranged next to one another as well as along a largely straight-line running path, are supplied to an elongated supporting tube SR, and this supporting tube SR, which is part of means for introducing the light waveguides, follows the running wheel UR and is arranged longitudinally fixed in place or, respectively, stationary. The supporting tube SR is preferably introduced from above into the inside of the forming longitudinally slotted tube RO1 proceeding from the input side and being introduced through the longitudinal slot LS that is still wide open, namely particularly before the half-cylinder MB* is shaped further to form the approximately cylindrical tube RO1, which is shown with portions broken away in FIG. 1, i.e., is shown in longitudinal section. At the input side, the supporting tube SR expediently comprises an introduction opening which is conically tapering in the conveying direction and projects trumpet-like toward the outside opposite the introduction direction of the light waveguide bundle LB. Along a sub-section at the input side, the tube is fashioned as a delivery nozzle ZST that projects essentially obliquely into the inside of the longitudinally slotted tube RO1 and then the tube bends into a part LT which is in the longitudinal course of the tube RO1 so that the tube SR essentially extends on a straight line in the inside of the tube RO1. The long part LT of the tube SR extends in the inside of the metallic tube, preferably up to the output end of the shaping section FA. In FIG. 1, the tube SR is thereby preferably centrally accommodated inside the cylindrical tube RO1, i.e. in the metallic cladding. As viewed in the haul-off direction AZ1, the tube SR particularly approximately extends from the longitudinal location, at which the longitudinally slotted tube RO1 is formed, through the welding region of a following welding means SV as well as through the rolling section of a rolling means WV following farther thereafter and up to the output of the shaping device FV.

The tube longitudinally welded with a welding means SV, particularly a laser or welding electrode, is thereby referenced RO2. In particular, the supporting tube SR serves the purpose of protecting the light waveguides LW1–LWn against mechanical, thermal and/or other stresses on all sides from the outside until the introduction or, respectively, release of the waveguides into the completely shaped tube. The completely shaped tube is thereby referenced RO3 in FIG. 1. Advantageously, the supporting tube SR also lends the light waveguides guidance until the metallic tube has been brought into its ultimate shape at the output of the shaping section FA. The support tube SR allows the light waveguides to enter into the completely shaped tube RO3 with free mobility only at its output end ASR. As a result thereof, lateral, particularly radial excursions or a lateral escape of the light waveguides LW1–LWn are largely avoided with reference to the longitudinal course of the central axis of the supporting tube SR, so that defined introduction conditions are offered for the light waveguides. The light waveguides LW1–LWn thus follow the longitudinal course of the central axis of the supporting tube SR, i.e. a defined, particularly an essentially straight-line course along the sub-sections ZST, LT, is prescribed for them and they are thus allocated a defined continuous length. To that end, the supporting tube SR expediently comprises only such an inside diameter that the light waveguides LW1–LWn can be guided along therein with only a little play. The light waveguide bundle LB is preferably guided in the supporting tube SR with at most $^2/_{10}$ mm particularly with at most $^1/_{10}$ mm play. An undulation of the light waveguides LW1–LWn in the inside of the supporting tube SR along the longitudinal extent thereof is thus largely avoided. The inside diameter of the supporting tube SR is preferably selected between 0.1 and 10 mm, particularly between 0.5 and 3 mm. The supporting tube SR preferably extends over an overall length between 60 and 2000 mm.

The supporting tube SR thus provides a prescribable, particularly an essentially straight-line path in the tube RO1 or, respectively RO2 for the light waveguides LW1–LWn, so that the final admission length is assured for the light waveguides LW1–LWn. An essentially freely occurring path in the inside of the completely welded and rolled tube RO3 is only enabled for the light waveguides LW1–LWn beginning with the emergence of the light waveguides LW1–LWn from the opening ASR of the supporting tube SR at the output side. The supporting tube SR advantageously opposes a lateral, particularly radial escape or buckling of the respective light waveguides LW1–LWn with reference to the central axis of the tube since the tube SR prescribes a defined, particularly an essentially straight-line running path for the respective light waveguide. A laterally, particularly radially effective support for the light waveguides LW1–LWn is thus created with reference to the central axis of the tube RO1 passing through any straight line. As a result of prescribing the running path with the assistance of the supporting tube SR, defined conditions between the production length of the tube RO3 and the introduced length of the respective light waveguide are advantageously largely assured. In that the supporting tube SR extends in the tube on an essentially straight line along the shaping section FA, a direct, unambiguous allocation of the running length of the respective light waveguide to the continuous length of the completely shaped, metallic tube RO3 is offered in an especially simple way. An especially precise setting of the excess length of the light waveguides is enabled in this way.

In order to also be able to introduce a filling compound FM into the completely shaped tube RO3, an additional delivery tube or elongated filling tube FR is provided that is introduced into the inside of the tube RO1 proceeding from the admission side. This filling tube or guide tube FR is preferably attached with a fixed longitudinal location. Expediently, it is arranged around the supporting tube SR at the outside with a spacing therefrom so that a longitudinal channel, particularly an annular gap channel, is formed between the supporting tube SR and the filling tube FR. Expressed in other words, the supporting tube SR is placed in the filling tube FR so that a gap clearance remains between the outside of the supporting tube SR and the inside wall of the filling tube FR for the delivery of filling compound. To that end, the longitudinally slotted tube RO1 is expediently pre-shaped with such a large inside clearance, particularly inside diameter, that adequate space is present in the inside of the tube RO1 for the accommodation of the double arrangement of the supporting tube SR and filling tube FR. The filling tube FR proceeds at least through the welding region of the welding means SV and, in FIG. 1, it extends essentially on a straight line. The supporting tube SR as well as the filling tube FR preferably comprises an essentially circular-cylindrical shape. In particular, the filling tube FR surrounds the supporting tube SR approximately concentrically, so that a coaxial, double arrangement of the supporting tube SR and filling tube FR is formed and an essentially annular gap channel RS extends between them.

The filling compound FM is pumped into this annular gap RS between the filling tube FR and the supporting tube SR at the input side via a filling nozzle FS that is connected to a reservoir BH. A thixotropic, pasty, soft compound or a gel is preferably employed as filling compound FM in order to be able to render the finished optical transmission element largely longitudinally water tight. The filling tube FR is expediently sealed in the entry region of the supporting tube SR. The end AFR of the filling tube FR at the output side preferably ends in front of the end ASR of the supporting tube SR at the output side as viewed in longitudinal direction, i.e. the supporting tube SR has its end ASR projecting beyond the output AFR of the filling tube FR. As viewed in the haul-off direction AZ1, the filling tube FR comprises a shorter, straight-line longitudinal extent than the supporting tube SR for the light waveguides LW1–LWn. It is thus assured that, viewed in the haul-off direction AZ1, the filling compound FM is first introduced into the tube RO2 before the light waveguides LW1–LWn are added. Advantageously, this enables the light waveguides LW1–LWn to be dragged into the finished tube RO3 later by the filling compound FM. The filling tube FR preferably extends approximately into the middle of the longitudinal extent or, at most, up to the output of the roller means WV. Compared thereto, the supporting tube SR preferably ends somewhat later viewed in the haul-off direction AZ1, for example, following the output of the roller means WV or only following a potential drawing mechanism such as, for example, ZV. The filling tube FR thus follows the course of the supporting tube SR but already ends before the output ASR of the supporting tube SR. With the assistance of the filling tube FR, thus, the filling compound FM is introduced into the tube at a point in time before the tube has been rolled down to its ultimate dimensions, i.e. before it has been reduced in cross sections. It is thus assured that the filling compound FM essentially completely fills the inside of the completely shaped tube RO3 after the completion of the rolling process and the potentially following drawing process.

A material or a coating having high temperature resistance is expediently employed for the supporting tube SR and/or the filling tube FR since the supporting tube SR as well as the filling tube FR are conducted under the welding point of the welding means SV in the tube RO1. A metal, particularly hard-drawn or, respectively, hardened stainless steel is preferably selected for the supporting tube SR and/or the filling tube FR in order to protect the filling compound and/or the light waveguides against mechanical and/or thermal stresses as well as against other disturbances upon introduction into the tube.

It can be especially expedient to lend the longitudinally slotted tube RO1 a cross sectional shape with an optimally large inside clearance, particularly inside diameter before the welding of the longitudinal slot LS in order to be able to hold the double arrangement of the delivery tube FR/SR at an optimally great distance from the weld of the metallic tube RO2 being formed. It can thereby be especially advantageous to arrange the filling tube FR as well as the supporting tube SR seated along an inside of the longitudinally slotted tube that lies opposite the longitudinal slot LS to be welded. When, for example, the tube RO1, as shown in FIG. 1, is closed from above with the assistance of the welding means SV, then it is expedient to arrange the double arrangement of filling tube FR and supporting tube SR along the inside wall lying approximately 180° opposite the slot LS and, therefore, at the floor of the metallic cladding or, respectively, tube RO1. In this way, the distance between the welding means SV and the filling tube FR and tube SR can be kept as great as possible, so that the intensity of the heat radiation output by the welding means SV has already decayed somewhat at the location of the filling tube FR as well as of the supporting tube SR.

Figure 4:
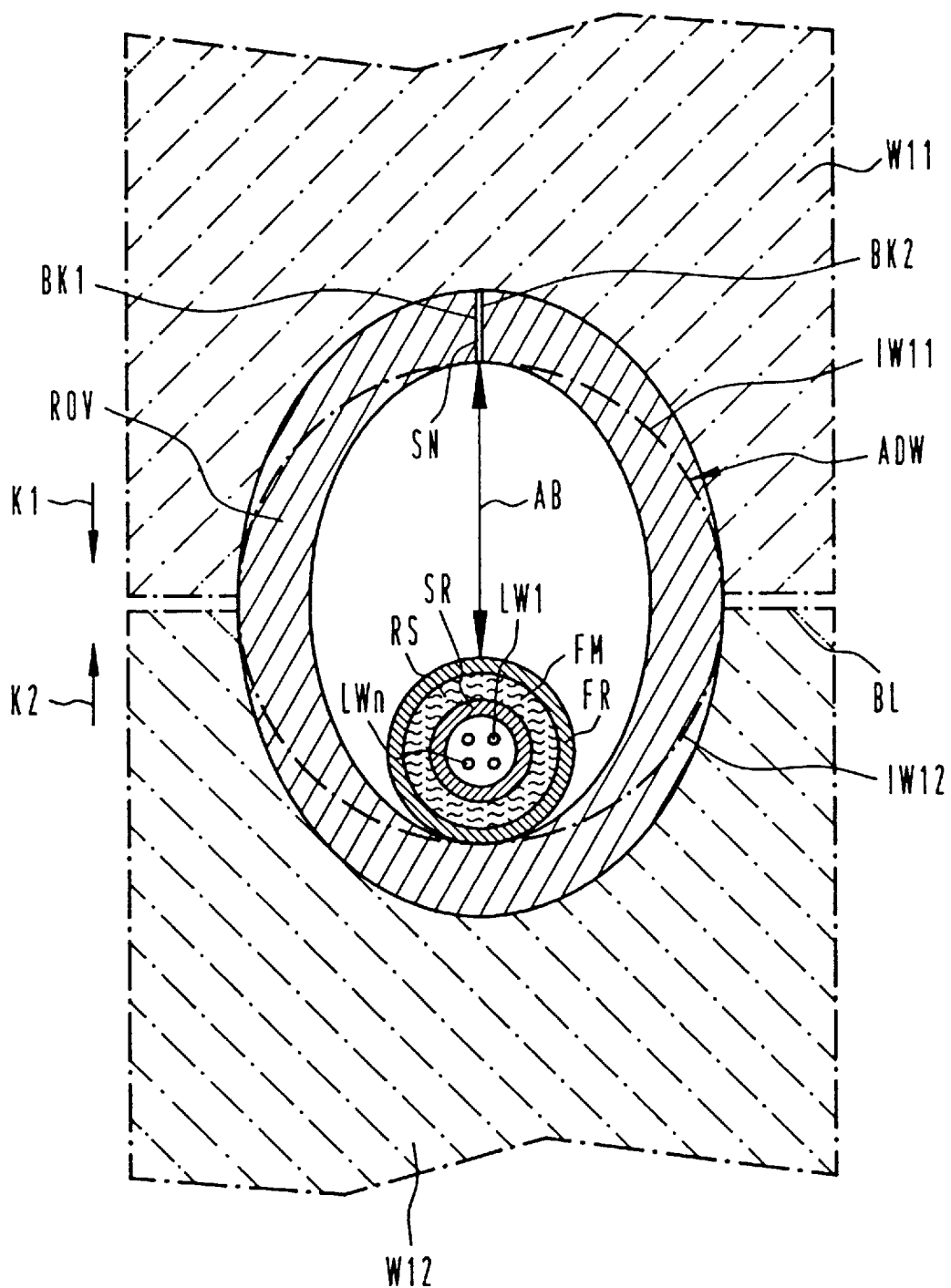
FIG. 4 is a schematic cross sectional view of the metal tube for the light waveguides in the region of the welding device in the first sub-section of the production line of FIG. 1.

In addition, it can be especially expedient to pre-shape the longitudinally slotted tube to be oval for the welding process, instead of shaping it into a circular cross section. FIG. 4 shows such a metallic cladding pre-shaped highly oval in an enlarged cross section. As a result thereof, the inside clearance between the double arrangement of the delivery tube SR/FR and the weld being formed is increased even more for the welding process compared to the spacing ratios in a longitudinally slotted tube which is fashioned circular-cylindrical.

Viewed in summary, thus, the inside clearance, particularly the inside diameter, of the longitudinally slotted tube RO1 to be welded is selected significantly greater than the inside clearance, particularly the inside diameter, of the completely rolled tube RO3 at the output of the shaping device FV. The tube RO1 to be welded preferably has an inside diameter that is at least 10 percent, and preferably about 50 percent greater than the completely shaped, rolled tube RO3. In particular, the above statements also apply to the maximum, inside clearance of the metallic tube having a highly oval cross sectional shape measured between the top and bottom thereof.

The longitudinally slotted tube RO1 or, respectively, the completely welded tube RO2 preferably comprises a wall thickness in a range between 0.1 and 10 mm, and preferably in a range between 0.1 and 1 mm. The gap width of the annular gap channel RS is preferably equal to at least 0.2 mm, preferably in a range between 0.2 and 1 mm. The filling tube FR preferably ends before the end of the supporting tube SR, for example, the supporting tube SR has its end ASR projecting beyond the output end AFR of the filling tube FR. The supporting tube preferably projects beyond the end AFR of the filling tube by at least 100 mm, preferably in a range between 200 and 400 mm. The filling tube FR preferably extends roughly into the middle of the rolling device WV that is arranged along the end section of the shaping device FV at the output side. The supporting tube SR, by contrast, ends later in the haul-off direction AZ1, particularly in the output region of the rolling device WV or of a drawing device ZV potentially following the rolling device WV. With the assistance of the filling tube FR, the filling compound FM is already introduced into the tube RO2 at a point in time before this tube has been shaped down to its smaller, ultimate diameter. It is thereby largely assured that the filling compound FM completely fills the inside of the completely shaped tube after the completion of the rolling process or, respectively, of the following drawing process.

The supporting tube SR preferably comprises an inside diameter that is at least $2/10$ mm smaller than the inside diameter of the finished tube RO7 (see FIG. 2) at the end of the production line. Expediently, the filling tube FR comprises an outside diameter that is at least $5/10$ mm smaller than the inside diameter of the unrolled, welded tube RO2. The outside diameter of the filling tube FR is preferably selected in a range between 4 and 6 mm.

FIG. 4 shows a schematic cross section of the metallic tube for the light waveguides in the region of the welding device SV in the first part of the shaping section FA of FIG. 1. The metal band MB is expediently pre-shaped thereafter to a highly oval tube ROV, whereby its band edges BK1 and BK2 abut. The tube ROV thus comprises a cross sectional shape whose inside clearance between the two band edges BK1 and BK2 to be welded to one another at the upper side and the inside tube wall lying approximately 180° opposite the band edges is enlarged compared to the clearance of a tube that is merely pre-shaped circular-cylindrically. The shaping tools required for this purpose have been omitted from FIGS. 1 and 4 for the sake of clarity. The filling tube FR with the supporting tube SR arranged concentrically therein are arranged preferably along an inside of the oval, metallic cladding ROV that lies opposite the weld SN of the tube RO2 that is formed, for example, it proceeds along the floor of the tube RO1. In that the filling tube FR is kept at an optimally great distance AB from the inside surface of the weld SN, a first thermal insulation is already offered for the light waveguides LW1–LWn, and this insulation is formed by the air-filled gap between the weld SN and the outside wall of the filling tube FR. The filling tube FR itself acts radially inwardly as a further thermal insulating layer. The filling compound FM in turn likewise acts as a thermal insulation layer. The supporting tube SR effects a still further thermal shielding for the light waveguides LW1–LWn lying in it. In this way, a multi-layer, particularly four-layer thermal insulation sheath and, therefore, an especially effective thermal shielding or barrier is formed for the light waveguides LW1–LWn. The light waveguides LW1–LWn are thermally separated from the weld point by a formality of the insulating layers. Viewed in detail from the inside to the outside, these are: the cladding of the supporting tube SR, the filling compound FM in the annular gap channel RS between the filling tube FR and the supporting tube SR, the cladding of the filling tube FR as well as the air-filled space AB between the filling tube FR and the inside edge of the welded tube RO2. Potentially inadmissibly high thermal stresses on the light waveguides LW1–LWn and/or the filling compound FM can be largely avoided in this way when welding the longitudinal seam of the tube ROV, which has been pre-shaped into an oval.

A prescribable cross sectional shape is subsequently impressed on the longitudinally welded tube RO2 with the assistance of a roller means WV following the welding means SV. In particular, the welded tube RO2 can be reduced in diameter and lengthened in a precisely controllable way with the assistance of the roller means WV. To that end, the roller means or, respectively, rolling mill WV comprises at least one disk-shaped, particularly approximately circular-cylindrical roller. A plurality of rollers are preferably positioned following one another at both sides of the longitudinal extent of the tube RO2 preferably passing through any straight line. These being respectfully allocated to one another in pairs. For example, three roller pairs W11/W12, W21/W22, W31/W32 are indicated in the longitudinal section of FIG. 1, and these each respectively comprise a roller at both sides of the longitudinal extent of the tube RO2, which preferably passes through on a straight line. These rollers are referenced W11, W21, W31 at the upper side (as viewed in haul-off direction AZ1) and with W12, W22, W32 at the underside of the tube RO2 lying there opposite. Two rollers at opposite long sides of the tube RO2 thereby respectively correspond with one another, for example, they form a respective roller pair. Each roller is rotatably suspended. A separate drive mechanism MO1 through MO3, which are each particularly a motor, is allocated to the respective roller pair such as, for example, W11/W12, W21/W22, W31/W32, so that an active drive for each roller is enabled. The running surfaces of respectfully two rollers allocated to one another in each roller pair roll off on opposite sub-halves of the outside surface of the tube RO2 and thereby exert a prescribable force of pressure into the inside of the tube on the outside wall surface thereof. As viewed in the throughput direction or, respectively, the haul-off direction AZ1 in the longitudinal section of FIG. 1, these, in detail, are the rollers of the three roller pairs W11/W12, W21/W22, W31/W32 arranged in a row immediately following one another. Respectively two rollers allocated to one another thereby enclose the traversing tube RO2 between them and prescribe a through opening having a specific cross sectional shape for the pair. The two rollers of the respective roller pair rolling off on one another respectively particularly comprise, as viewed in cross section, an approximately semicircular recess or, respectively, inside contour (viewed radially inward to the midpoint of the roller) at their outside circumference, which is the respective running surface. An approximately circular-cylindrical passage is thus preferably offered between the running surfaces of two respective rollers rolling off on one another in this way. The cross sectional shape thereof is preferably impressed or, respectively, imprinted on the tube RO2 by radial transverse pressure pressing. The material of the tube wall is thereby pressed radially inward with reference to the central axis of the tube and is plastically deformed with material flow. The pressing with the transverse pressure thereby effects, first, that the tube RO2 is trans-axially, and particularly radially crushed and the inside diameter of the tube as well as outside diameter is thereby reduced. At the same time, the pressing with the transverse pressure leads to a displacement of material or, respectively, to a material flow along the longitudinal extent of the tube RO2 so the tube is stretched or lengthened. In particular, the tube is lengthened per roller pair, i.e. per rolling event expressed in general terms, by approximately the same percentage with reference to its length before the rolling process as the tube is compressed in the radial direction per rolling process with reference to its outside diameter before the rolling process. As a result thereof, the wall thickness of the tube remains approximately constant during rolling, whereas the outside diameter as well as the inside diameter of the tube is reduced by approximately the same percentage. A reduction of the torus-shaped or, respectively, annular wall cross sectional area of the tube RO2 is thus achieved given an essentially constant wall thickness.

Viewed in the haul-off direction AZ1, the size of the through opening between respectively two rollers allocated to one another in a roller pair is reduced in steps from roller pair to roller pair, for example, the cross section of the through opening for the tube is reduced in stages from one roller pair to the next and a successive reduction in cross section of the tube RO2 is thereby achieved. The rollers W21, W22 allocated to one another are thus moved closer to the central axis of the traversing tube RO2 than the first roller pair W11/W12. Compared to the second roller pair W21/W22, finally, the third roller pair W31/W32 comprises a through opening whose clearance is again reduced compared to the inside diameter of the preceding through opening of the preceding, second roller pair W21/W22.

The conveying speeds of two roller pairs following one another in haul-off direction AZ1 such as, for example, W11/W12, W21/W22 are preferably set different so that, in addition to the normally introduced running length of the tube RO2, at least the lengthening thereof achieved by the pressing with the transverse pressure or trans-axial compression, can be co-conveyed in the haul-off direction AZ1 from the clearance between the two roller pairs following one another. It can be particularly expedient to select the conveying speed of the roller pair at the respective output side, as viewed in the haul-off direction AZ1, so that, for example, the conveying speed of the pair W21/W22 is greater than the conveying speed of the respectively preceding roller pair at the input side, for example W11/W12, and is greater by only such a percentage that approximately corresponds to the percentage of the lengthening of the tube RO2 achieved by the pressing with the transverse pressure when compared to the originally introduced running length thereof. In that, given two following roller pairs, the roller pair of the output side particularly runs so much faster than the respectively preceding roller pair or the roller pair adjacent to the input side, to the same extent as this lengthens the traversing metal tube RO2 in percent so that the tube RO2 remains largely neutral in terms of tensile stress during the rolling process. The conveying speed of the plurality of roller pairs arranged following one another such as, for example, W11/W12, W21/W22, W31/W32 thus preferably successively increases per roller pair by such an amount that only the excess length generated in the longitudinal direction by the transverse pressure compression can be conveyed out of the rolling path. In such a rolling, thus, the tube RO2 is preferably conveyed forward by the drive of the rollers so that the lengthening of the tube respectively generated by the pressing with the transverse pressure is merely compensated. Inadmissibly high forces of tensile stress as well as compressive forces in the longitudinal direction with the metal tube RO2 can thus be largely avoided.

In addition, the driven rollers advantageously enable the conveying speed for the tube to be set in a precisely controllable way from one roller pair to the next roller pair. As warranted, it is thereby possible to exert an additional, prescribable tensile force in precisely this fashion onto the metal tube RO2 in the haul-off direction AZ1 only respectively along the short traversal distance between two respective roller pairs following one another in the longitudinal direction in order to lengthen the tube in addition to the lengthening proceeding from the rolling process with pressing with a transverse pressure.

Preferably, between 1 and 10 roller pairs, particularly between 3 and 7 roller pairs, are arranged following one another for the rolling, and the number is dependent on the desired lengthening as well as on the reduction in the diameter of the tube. A stretching or lengthening of the tube compared to its original running length before the respective roller pair can be achieved for each roller pair in a range between 5 and 20 percent, and preferably in a range between 5 and 15 percent. Since the wall thickness of the tube remains essentially constant during the rolling process, a reduction of the annular wall cross sectional area of a range between 5 and 20 percent, preferably a range between 5 and 15 percent referred to the wall cross sectional area before the respective rolling process will occur for each roller pair. Upon departure from the roller means WV, the tube is preferably lengthened overall by a range of 10 through 70 percent of the length originally introduced into the roller means WV.

The roller means WV is particularly characterized in that an especially effective but simultaneously gentle lengthening and cross sectional reduction of the tube can be implemented along a relatively short rolling path, which is preferably between 0.5 and 1.5 meters in overall length. Since the rollers of the respective roller pair are driven in a rotating fashion, the tube RO1 is simultaneously pushed forward in the haul-off direction AZ1 during the transverse pressure pressing, so that a "seizing" or, respectively, hang-up of the tube in the respective roller pairs and, thus, a breakage of the tube are largely avoided. When the respective roller rolls off of the outside roll of the tube, the frictional force, which is taking effect, is thereby far lower than when contacting the outside wall with only one rigid, stationary, for example, removably suspended drawing block. As a result thereof, the cross sectional surface tension in the outside wall of the tube is reduced in the haul-off direction AZ1 during rolling compared to that when drawing with a drawing block, so that a formation of stress fractures in the outside wall of the tube is largely avoided during rolling.

Compared to a traditional cross sectional reduction with a "drawing block", the rolling is thus particularly characterized in that inadmissibly high forces of tensile stress at the tube and, thus, stress fractures or even a breaking of the tube RO2 are largely avoided.

What is also advantageously achieved due to the lengthening generated during rolling is that the throughput speed of the tube when traversing the welding arrangement SA is lower than the fabrication speed when leaving the rolling device. Given a 100 percent diameter reduction with rollers with retention of the wall thickness of the tube, in particular, a doubling of the ejection speed of the tube when leaving the rolling means approximately occur and equals the "efficiency effect". On the one hand, this allows a reliable welding of the tube given a relatively low manufacturing speed. On the other hand, a high fabrication output can be obtained at the same time.

Since the roller pairs are fashioned divisible, their manipulation is advantageously significantly simplified. Further, one emphasizing roller means can advantageously be flexibly utilized for tubes having different diameters. Thus, for example, the rollers of individual roller pairs, which, for example, is at the end of the rolling path where the passage for the tube is smaller than at the start, in the sequence of roller pairs graduated in terms of the size of the diameter can be moved farther apart or entirely hinged away from one another for different tubes.

Of course, a roller device according to the disclosed principle can also be advantageously utilized in production lines for light waveguide-equipped metal tubes other than those shown in FIGS. 1–4.

For a better illustration of the function and action of the roller device of FIG. 1, the roller pair W11/W12 thereof that follows the welding arrangement SA of FIG. 1 is additionally entered in dot-dash lines by way of example in the cross sectional view of FIG. 4. The reducing rollers W11 and W12 each respectively comprise a semicircular inside contour IW11 and IW12, respectively. The reducer roller W11 is thereby allocated to the upper sub-half and the reducer roller W12 is allocated to the lower sub-half of the highly oval tube ROV residing 180° there opposite. With reference to the central axis of the tube ROV ovally pre-shaped (preferably for the welding process), the two reducing rollers W11, W12 press radially against one another, this being indicated by two arrows K1, K2 directed toward one another. The two rollers roll off on one another in the region of their common contacting line BL that extends transaxially to the haul-off direction AZ1 and enclose the tube ROV between them in the fashion of a positive lock. The two reducing rollers W11, W12, rolling off on one another, thus enclose a through opening having a circular-cylindrical cross sectional shape. Their cross sectional dimensions are reduced compared to the maximum cross sectional width of the highly oval tube ROV. The predetermined cross sectional shape of this through opening between the two rollers W11, W12 is indicated in FIG. 4 with the assistance of a circle ADW entered as a dot-dashed line. This circle ADW proceeds essentially within the outside circumference of the oval tube ROV. The oval tube ROV is radially inwardly compressed into the outside cross sectional shape of the circle ADW by the rollers W11, W12. In particular, the rolling process makes it possible to round the points of the oval tube ROV off, for example, to press them inward and, thus, enables a plastic deformation of the oval tube ROV reshaped into a preferably approximately circular-cylindrical tube RO with a reduced outside diameter.

The roller pairs W11/W12, W21/W22, W31/W22 following one another each respectfully comprise through openings that comprise an inside diameter reduced in steps as viewed in the haul-off direction AZ1. In this way, the oval tube ROV is reduced in diameter in stages or, respectively, steps per roller pair and a radial compression to a smaller outside diameter compared to the original cross sectional dimensions before the roller device WV is undertaken. The rolling process is particularly characterized in that the rollers driven in a rotating fashion roll off at the outside on the metallic cladding or, respectively, the tube ROV and exert radial pressure and thereby push or, respectively, convey the tube ROV pressed between them in the haul-off direction AZ1. As a result of this combination of radial compression and axial feed, inadmissibly high tensile stresses that, for example, could lead to a tearing of the tube ROV, are largely avoided. The mere employment of drawing blocks of a traditional type, namely, would lead to a roughening or tearing of the metallic cladding or, respectively, of the tube. Since, given drawing blocks, pulling on the tube ROV would only be undertaken in an axial direction proceeding from the end of the production line, the tube would be locally constricted at the respective drawing block or would even "seize" thereat. By contrast thereto, the roller pairs W11/W12, W21/W22, W31/W32 of FIG. 1 are independently driven with the assistance of the allocated drive devices or drive motors MO1, MO2, MO3 and a forward feed motion of the tube RO2 is effected. As a result thereof, for example, the oval tube ROV of FIG. 4 is subjected to far less tensile stress during the rolling process since it is conveyed forward not only by the individual haul-off device (as shown in FIG. 2) at the end side. Since the rolling process effects a plastic cold-deformation of the metallic cladding, this is also advantageously hardened and, thus, becomes particularly resistant to potential mechanical, chemical and/or thermal stresses.

It can be potentially expedient to also follow the roller means WV with a drawing means, particularly at least one drawing block or a drawing nozzle. In the longitudinal section of FIG. 1, for example, the roller means WV is followed by the drawing block ZV, which is partly indicated in dot-dash lines. The block ZV comprises a conically tapering through opening with prescribable cross sectional dimensions. The block ZV only serves for a final smoothing or, respectively, burr removal or final lengthening of the rolled tube RO2.

Dependent on the selection of the inside contour of the running surfaces of the rollers, the roller means thus makes it possible to press a prescribable cross sectional shape on the tube. In particular, the preferably approximately circular-cylindrical tube RO3 having the desired cross sectional dimensions is preferably obtained with the rolling process and after the complete shaping.

It can also be potentially already adequate for a cross sectional reduction of the tube RO2 with the assistance of the roller means WV to have the respective reducing roller of a roller pair roll off only in a sub-section of the outside circumference of the tube ROV to be cold-worked, and this sub-section is smaller than half the desired outside circumference of the tube following the respective roller pair. It can also be potentially expedient to arrange the roller pairs behind one another respectively offset or, respectively, turned in circumferential direction. An essentially uniform cold-working can thereby be achieved at the outside circumference of the tube RO2. Given three successively arranged roller pairs as shown in FIG. 1, thus, it is expedient to respectively position the roller pairs turned relative to one another by 120° along the outside circumference. Of course, it can also be expedient to arrange more than two rollers around the outside circumference of the tube RO2 per longitudinal location. For example, four rollers in the form of 90° segments can thus be allocated to the outside circumference of the tube per longitudinal location. It can thereby be adequate to drive only two rollers residing opposite one another in rotating fashion, whereas the remaining two rollers are not separately motor-driven and merely roll off at the outside circumference of the traversing tube due to the effected friction and/or positive lock.

In FIG. 1, the filling tube FR extends approximately up to the middle of the rolling means WV and pumping into the rolled tube is carried out thereat before the reduction of the tube to a prescribable ultimate diameter. As a result thereof, the filling compound FM fully fills the tube after the reduction to the ultimate diameter, for example, after leaving the rolling means WV. The supporting tube SR, by contrast, extends roughly up to the end of the shaping section FA, for example, beyond the output end of the rolling means WV and, thus, beyond the end of the filling tube FR. It is thus largely assured that the light waveguides LW1–LWn are entrained in the haul-off direction AZ1 by the filling compound FM with the same speed as the metallic, completely shaped cladding or tube RO3. The consistency of the filling compound FM is, in particular, selected so that an essentially firm coupling of the light waveguides LW1–LWn to the tube RO4 is achieved following a lengthening section LA. A viscosity of at least 10000 mP second is preferably selected for the filling compound FM. Such a high-viscosity filling compound FM softly embeds the light waveguides LW1–LWn and produces a firm coupling to the inside wall of the traversing tube RO3 via the viscous friction. What this means in other words is that the light waveguides LW1–LWn are entrained or ganged synchronously with the production speed of the tube RO2 coming from the rolling means WV, and that the respective light waveguide is entrained such by the filling compound due to the viscous friction thereof that the waveguide comprises essentially the same conveying speed in the lengthening section as the completely shaped tube. A defined relative relationship between the length of the completely shaped tube RO3 and the entrained length of the light waveguides LW1–LWn is thus produced at the output of the shaping section FA. In particular, the supporting tube SR serves the purpose of conducting the light waveguides LW1–LWn to the end of the supporting tube at the output of the shaping means FA with a very low tensile force and relatively low friction. A tensile force of 50 cN, and preferably between 5 and 10 cN, is thereby preferably exerted at most on the light waveguides LW1–LWn. In this way, the light waveguides LW1–LWn enter into the tube RO3 essentially loose, and with a low tensile stress.

Viewed overall, the shaping section FA preferably has an overall length of between 4 and 10 meters, and preferably between 4 and 6 meters.

The shaping section FA is immediately followed by a lengthening means LV which is merely shown excerpted in FIG. 1 for space reasons. Proceeding from the output of the shaping section FA, the tube RO3 continues to be conveyed on a straight line along a lengthening section LA (see FIG. 2). The tube is referenced RO4 in the lengthening section LA, which is the second part of the production line schematically shown in FIG. 2. The tube RO4 is elastically stretched along the lengthening section LA. The tube RO4 is thus tensile-stressed, whereby the stretching of the material expediently remains below the apparent yielding point thereof in order to achieve a reversible longitudinal expansion. The elastic stretching or, respectively, expansion of the tube RO4 is generated in that the tube RO3 enters into the lengthening section LA with a lower production speed than the speed with which the tube is hauled-off at the output of the lengthening section LA. Expediently, the tube is thereby heated along the lengthening section LA. A heating device HF, for example a radio-frequency heating, is provided for heating the metallic tube RO4. This preferably emits a radio-frequency radiation in the direction onto the tube RO4 and thereby effects the heating thereof. The radio-frequency emission is symbolized in FIG. 2 with the assistance of radiant arrows ST. Preferably, the tube RO4 is stressed for tension along a distance of at least 2 meters, and between 2 and 10 meters, preferably between 3 and 4 meters, along the lengthening section LA. A tensile force of preferably at least 50 N, preferably in a range of between 50 and 1000 N, is applied onto the tube RO4 along the lengthening section. The tube RO4 is stretched as a result thereof and lengthened. The tube RO4 is expediently stretched by such an amount due to thermal elongation that the desired excess lengths amount for the light waveguides LW1–LWn is drawn into the tube and is established after relaxation of the force on the tube, i.e., relaxation of the tube. As a result thereof that the tube RO4 is conveyed forward on a straight line under tensile stress along the lengthening section LA, namely, it is assured that the light waveguides are introduced into the tube and conveyed forward essentially with the same length as the length of the tube RO3 emerging from the shaping device FV. The coupling of the light waveguides LW1–LWn to the inside wall of the tube RO4 is thereby effected by the viscous friction of the filling compound FM. The coupling of the light waveguides LW1–LWn to the forward motion of the tube can be additionally achieved or can be achieved independently of the filling compound FM in that the light waveguides LW1–LWn are enclosed in the metallic cladding RO4 to such a great length that, due to the frictional forces, the light waveguides LW1–LWn are partially or entirely prevented from being pushed back. In this way, the light waveguides LW1–LWn are entrained along the lengthening section LA synchronously with the metallic cladding RO4 with the same haul-off length as well as haul-off speed. They are thereby drawn into the tube RO4 essentially on a straight line, whereby they are entrained largely free of tensile stress, i.e. loosely into the tube RO4. As warranted, it can be expedient for this purpose to drive the supply reels VS1 through VSn as well as the running wheel UR of FIG. 1 in rotating fashion so that an additional forward feed is produced for the light waveguides LW1–LWn.

The tube RO4 is preferably heated to a temperature at least 150° C., and preferably to approximately 200° C. along the lengthening section LA. With reference to the tube length originally introduced into the lengthening section LA, the tube is expediently reversibly lengthened by at least 0.2 percent, and preferably in a range between 0.2 and 0.7 percent.

In FIG. 2, the lengthening section LA is immediately followed by the haul-off means AZV, which may be a creeper band haul-off or a haul-off pulley. Between the lengthening section LA and a following relaxation section RA, this haul-off means AZV sees to it that the tube RO4 continues to be conveyed forward along the lengthening section LA under a defined tensile stress and is thereby stretched in a defined way. The haul-off means AZV expediently has a heating device HZ allocated to it, so that the tube is also held at an elevated temperatures in the region of the haul-off means AZV. This condition of the tube is referenced RO5. The tube is preferably heated in the region of the haul-off means AZV so that it retains its temperature from the lengthening section LA. What is largely avoided as a result thereof is that a shrinking process of the lengthened tube RO5 can occur opposite the haul-off direction AZ1 in the lengthening section LA. A defined, effective decoupling of the lengthening section LA from the following relaxation section RA is effected in this way.

The haul-off means AZV is immediately followed by the relaxation means RV in FIG. 2. The previously lengthened tube RO5 is cooled and relaxed in the relaxation or, respectively, strain-relieving section RA so that the tube shortens again by its previously reversibly set lengthened amount insofar as possible. Along this relaxation section RA, the tube RO6 in FIG. 2 is guided further on a straight line aligning with the preceding lengthening section LA and is finally wound onto a supply drum AT for further-processing as a finished optical transmission element OE. As warranted, it can also be expedient to directly supply the finished tube RO7 to other processing stages for cable manufacture, which have been omitted from FIG. 2 for the sake of clarity. The transmission element OE is preferably wound onto the supply drum AT with a rate between 3 and 100 m/min, and preferably at a rate between 5 and 40 m/min. As a result of the cooling and relaxation of the tube RO6, the tube is shortened or shrinks. Since the light waveguides LW1–LWn are firmly coupled to the inside surface of the shrinking tube RO6 via the viscous friction of the filling compound FM, the light waveguides LW1–LWn are pushed together in the tube and subjected to a radial excursion. Their lateral excursions are thereby limited by the inside surface of the tube RO6. In particular, the light waveguides assume a helical course, i.e. the light waveguides thus comprise an excess length in the final condition compared to the tube RO7 which has now cooled. The light waveguides are referenced LW1* through LWn* in this final condition. The cooling of the tube RO6 in the relaxation means RV can be expediently ensue with a water cooling. The tube RO6 is preferably cooled to room temperature, particularly to approximately 20° C. along the relaxation section RA. The tube RO6 is preferably relaxed along the relaxation section RA on a distance of between 0.5 and 2 meters, and particularly between 1 and 1.5 meters. The manufacturing method according to FIGS. 1 and 2 is particularly characterized in that the metallic tube is always conveyed forward on a straight line. The lengthening of the tube along the lengthening section LA can thus be particularly effectively converted by the reversible shortening into the production of excess length of the light waveguides LW1–LWn.

The light waveguides LW1*–LWn* thus come to lie in the finished tube RO7 with a defined excess length. The excess length of the light waveguides LW1*–LWn* is thereby preferably variable from at least 0.2 percent, and preferably in a range between 0.2 and 0.7 percent with reference to the overall length of the finished tube RO7.

This optical transmission element OE can be employed in versatile ways in cable technology. In particular, it can be employed as power or communication cables with especially high demands made of the mechanical as well as thermal stability and particularly for high-voltage overhead lines or submarine cables. Because of the excess lengths of the waveguide, the light waveguides are seated largely stress-free in a metallic tube, even under various operating conditions.

Figure 3:
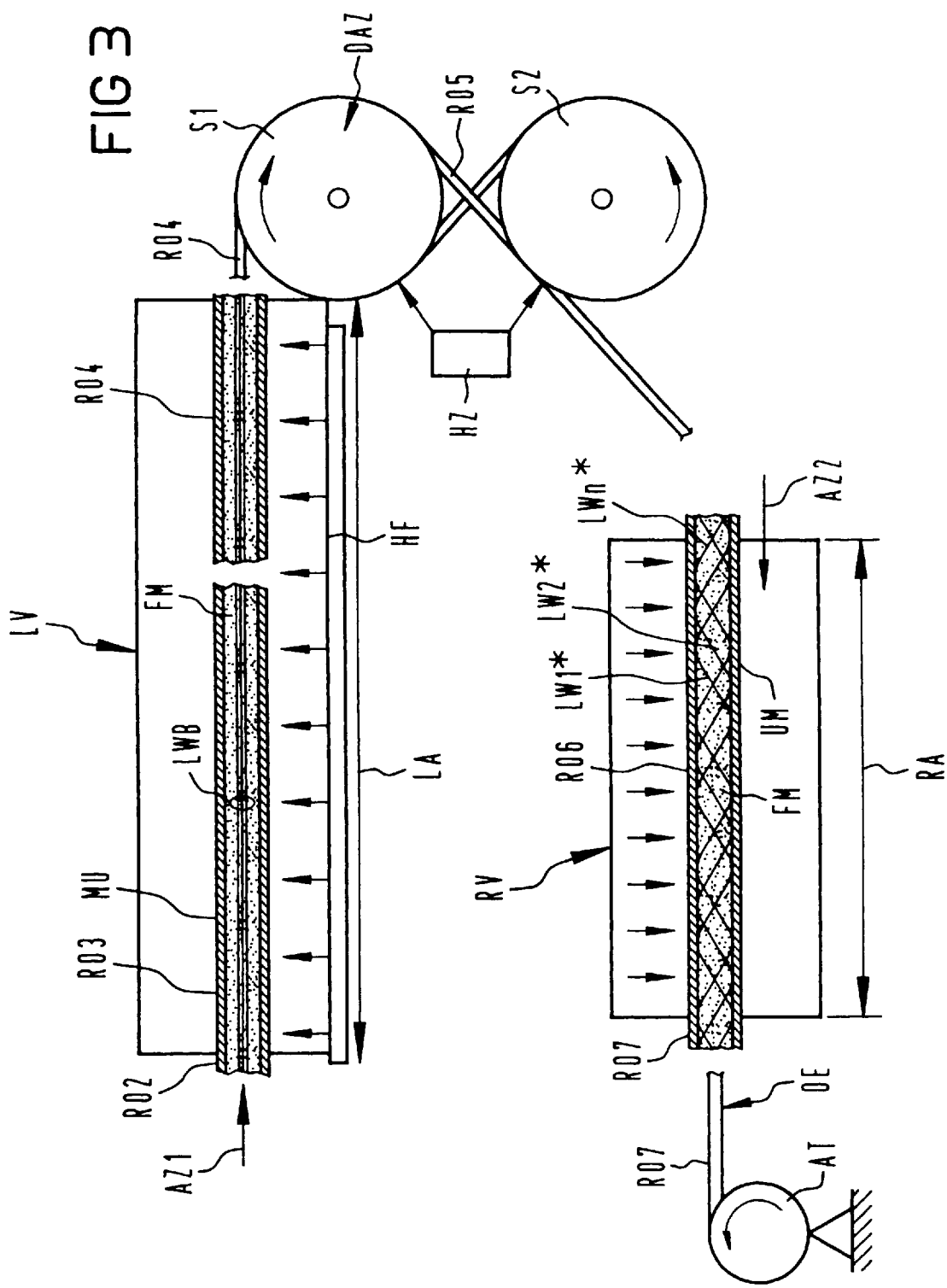
FIG. 3 is a schematic view of a modification of the second sub-section of the production line of FIG. 2.

In order to be able to accomplish the manufacture of the optical transmission element on an optimally short production line, it can be potentially expedient to provide a deflection means between the lengthening section LA and the relaxation section RA. In FIG. 3, a double pulley haul-off DAZ is provided as the deflection means. The lengthened tube RO4 is thereby looped around the two pulleys S1, S2 of the double pulley haul-off DAZ in the form of a figure "eight". It can be just as expedient to provide only a single roller or, respectively, haul-off pulley driven in a rotating fashion with which the lengthened tube RO4 is deflected from the original haul-off direction AZ1 into the opposite direction AZ2. Since the tube RO4 places itself against a sub-section of the outside circumference of the pulleys S1, S2, the light waveguides attempt to move out of the central axis of the tube into an inside path at the inside edge of the tube. The potential displacement of the light waveguides from the neutral axis onto such an inside path would lead to subsequent, undesirable losses in the excess length of the light waveguides. In order to be able to compensate for this, a correspondingly greater lengthening along the lengthening section LA for the tube RO3 is expediently undertaken from the very outset. The tendency of the light waveguides to place themselves in such an inside path is further advantageously opposed by the high-viscosity, tenacious filling compound due to the high material friction.

Figure 5:
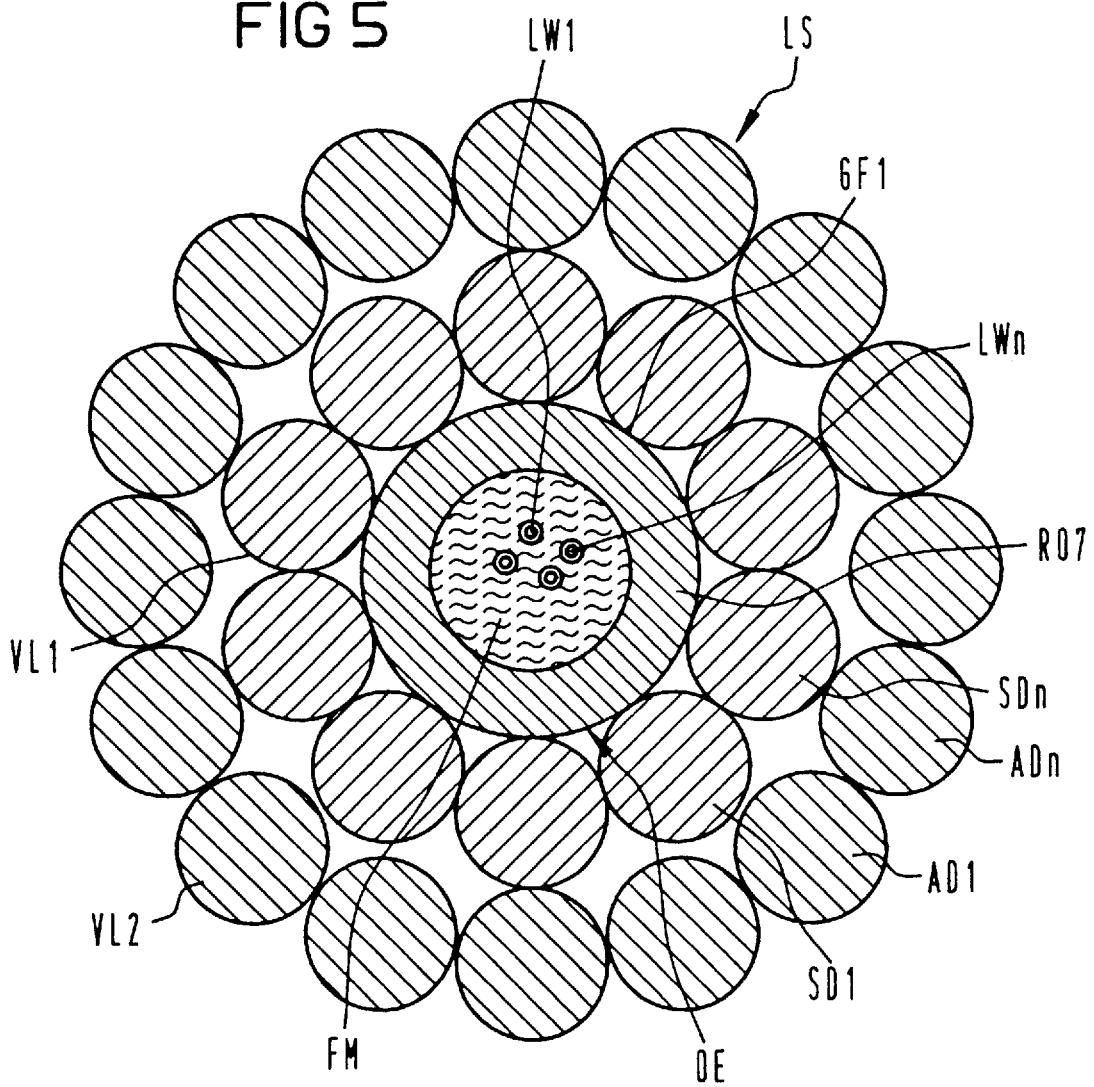
FIG. 5 is a schematic cross sectional view of a conductor strand with a light waveguide equipped metallic tube manufactured according to the present invention, such as in the apparatus of FIGS. 1 and 2.

FIG. 5 shows a schematic cross section of a line cable LS for high-voltage overhead lines with an inventively manufactured optical transition element such as, for example, OE of FIG. 2. This light waveguide-equipped metal tube OE is arranged, for example, in the center as a core element in FIG. 5. At least one ply of electrically conducted wires is placed over the tube RO7 of this optical transmission element OE. In FIG. 5, for example, at least one first stranding ply VL1 of steel or surrounding steel wires ST1 through STn is stranded around the metallic tube RO7. Over and above this, at least one outer stranding ply VL2 with wires AD1 through ADn is stranded on the inner ply VL1 and the wires AD1–ADn have a higher conductivity compared to the wires ST1–STn of the inner ply VL1. Aldry (AlMgSi alloy) or aluminum wires are especially suited for this purpose.

Expressed in summary, such an inventive, optical transmission element such as, for example, OE is preferably produced with the method steps in, for example, the following chronological succession:

1. A metal band such as, for example, MB is shaped to form a tube such as, for example, RO3 along the shaping section FA.
2. At least one light waveguide such as, for example, LW1 is introduced into the completely shaped tube RO3 only at or after departure from the shaping section FA. This is preferably achieved in that the tube is filled with filling compound and this filling compound entrains the light waveguides LW1–LWn into the tube.
3. The completely shaped tube RO3 is heated and reversibly or elastically stretched ("thermal elongation") in an immediately following lengthening section LA only upon departure from the shaping section FA.
4. Finally, the lengthened tube RO4 is cooled and relaxed after departing the lengthening region LA so that it is shortened and the respective light waveguide such as, for example, LW1 comes to lie in the shortening metallic tube RO6 with a defined excess length.

When welding the metallic tube, however, difficulties can occur in practice due to the welding heat that is produced. For example, the risk thus arises that an inadmissibly high thermal stressing and, thus, damage to the material or even a partial burning of the filling compound and/or of the plastic coating of the light waveguides will occur. In addition, the welding process is also critical because hydrogen can be released due to the local overheating. Such hydrogen can become free from, for example, damp ambient air, when melting the metal of the tube, from the filling compound, from the plastic coating of the light waveguides, etc. If such hydrogen were potentially entrained into the inside of the completely welded tube that is tight on all sides, then the hydrogen would remain there and lead to an undesirable rise in the transmission attenuations of the light waveguides.

Another expedient development of the invention is thus particularly based on the object of offering an apparatus which can optimally faultlessly weld a metallic tube into which at least one light waveguide and/or filling compound can be introduced. This problem is advantageously solved in that at least one cooled solid body is provided in the welding region and the body contacts the outside of the tube moving or traversing in the haul-off direction for cooling.

In that at least one cooled solid body contacts the tube in the welding region, an effective cooling of the tube is already advantageously enabled thereat. Deteriorations of the manufacturing quality of the metallic tube equippable with at least one light waveguide and/or filling compound are thus largely avoided.

A development of the invention is also directed to a method for welding the band edges of a tube shaped from an elongated metal band into which at least one light waveguide and/or filling compound are introduced. This method is characterized in that the tube traversing or moving in the haul-off direction is contacted from the outside by at least one cooled solid body in the welding region.

Figure 6:
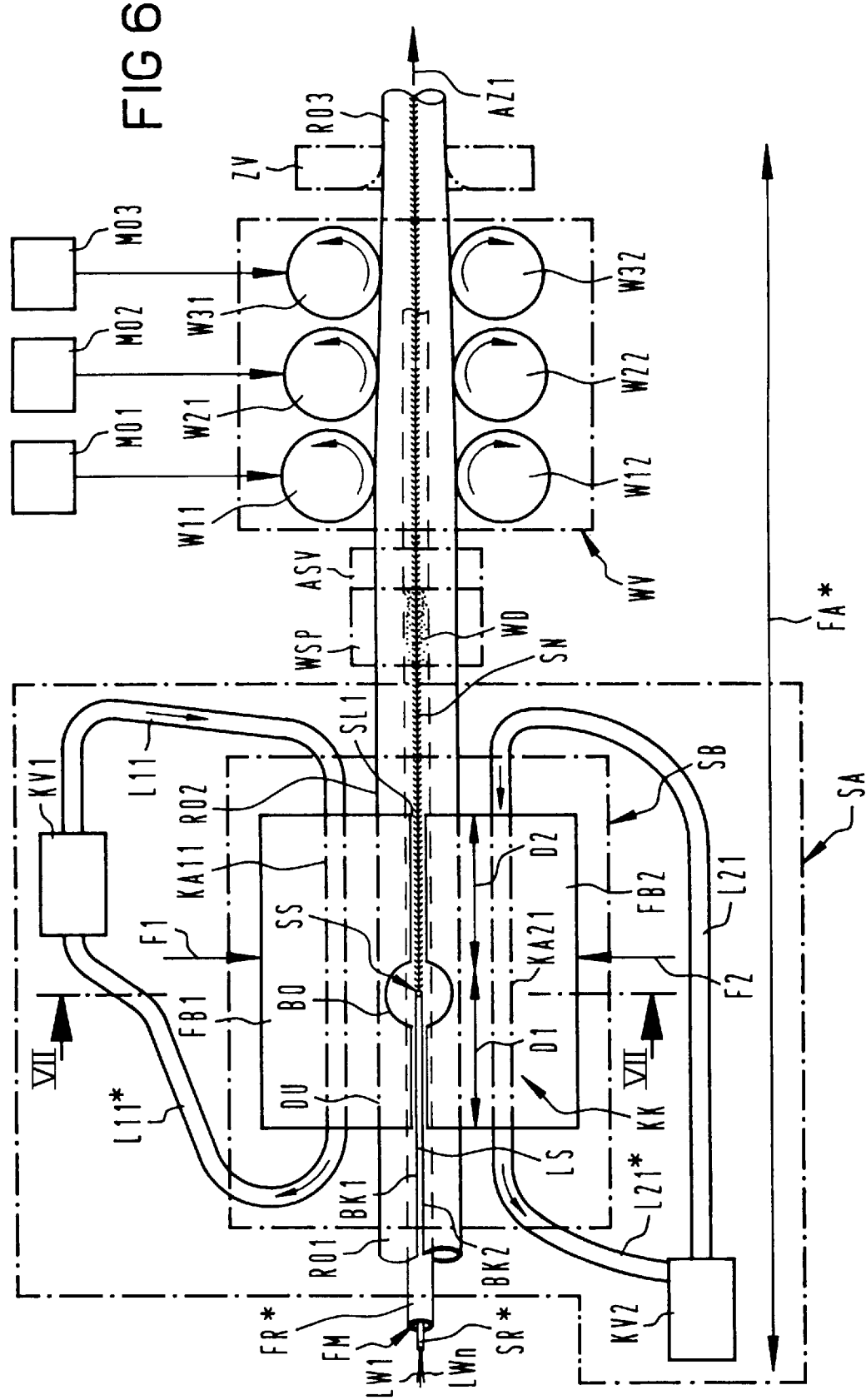
FIG. 6 is a schematic plan view of a sub-section of the production line at the welding arrangement for the elongated metal tube that can be equipped with at least one light waveguide and filling compound.

In a schematic plan view, FIG. 6 shows the part FA* of the output side of the shaping section of a production line for an optical transmission element. This optical transmission element is formed by a metallic tube in whose inside at least one light waveguide and/or filling compound can be introduced. First, a metal band of, for example, steel, stainless steel, copper, aluminum or the like is pre-formed to a preferably approximately circular-cylindrical tube such as, for example, RO1 of FIG. 1 with a longitudinal slot LS (longitudinally slotted tube). The shaping tools required for this purpose have been omitted from FIG. 6 for the sake of clarity. The longitudinal slot LS preferably extends essentially on a straight line as well as parallel to the central axis of the tube RO1. In FIG. 6, the longitudinal slot LS proceeds essentially centrally on the upper side of the tube RO1. The two band edges BK1, BK2 of the tube RO1 thereby reside opposite one another along the longitudinal slot LS with their edge faces facing toward one another.

In order to close the longitudinal slot LS of the tube RO1 and provide it with a weld SN, the tube RO1 in FIG. 6 is passed through an inventive welding arrangement, for example, SA (see FIG. 1), essentially on a straight line in the haul-off direction AZ1. The welding arrangement SA of FIG. 6 comprises a welding means SV (see FIG. 7) at the welding location SS and also comprises a cooling member or, respectively, cooled solid member KK, which is preferably arranged stationarily in the welding region SB around the actual welding location SS, and the member KK contacts the tube from the outside and extends longitudinally along both sides of the tube in the welding location SS. The welding device SV has thereby been omitted from FIG. 6 for the sake of clarity. The tube closed on all sides after the welding process with the assistance of the inventive welding arrangement SA is referenced RO2 in FIG. 6.

This tube RO2 is subsequently reduced in diameter and stretched with the assistance of a rolling device, preferably corresponding to WV of FIG. 1, that follows the welding arrangement SA. The rolling device or, respectively, the rolling mill WV comprises disk-shaped, particularly approximately circular-cylindrical rollers for this purpose. In the plan view of FIG. 6, they are merely schematically indicated at both sides of the longitudinal extent of the tube RO2, which is preferably passing through any straight line and, as viewed in the haul-off direction AZ1, are referenced W11, W21, W31 along the one side of the tube as well as W12, W22, W32 along the opposite side of the tube. In FIG. 6, respectively two rollers at opposite sides of the tube RO2 thereby correspond with one another and they respectfully form a roller pair. Of course, it can also be expedient to arrange more than two rollers all around the outside circumference of the tube RO2 at the respective longitudinal location. The two rollers of the respective roller pair in FIG. 6 roll off on opposite sub-halves of the tube RO2 on the outside surface thereof. Viewed in detail in the throughput direction or, respectively, the haul-off direction AZ1 in the plan view of FIG. 6, these rollers of the roller pairs W11/W12, W21/W22, W31/W32 are arranged immediately following one another. A separate drive means or motor MO1–MO3 is preferably respectively allocated to the respective roller pair W11/W12, W21/W22, W31/W32. The two rollers allocated to one pair thereby enclose the moving or traversing tube RO2 between them and prescribe a through opening having a specific cross sectional shape. The two rollers rolling off on one another in a respective roller pair respectively particularly comprise an approximately semicircular recess or inside contour (radially inwardly to the midpoint of the roller) at their outside circumference viewed in cross section in the throughput direction. In this way, an approximately circular-cylindrical passage is offered between respectively two rollers rolling off on one another. The cross sectional shape thereof is impressed or, respectively, imprinted on the tube RO2 preferably by a radial transverse pressing. The material of the tube wall is thereby radially inwardly pressed (with reference to the central axis of the tube) and is plastically deformed upon flow, for example is trans-axially and radially compressed and the inside diameter as well as the outside diameter of the tube are thereby reduced. Viewed in the haul-off direction AZ1, the through opening between two rollers allocated to one another per roller pair is reduced in steps and a successive cross sectional reduction of the tube RO2 is thereby achieved. The rollers W21/W22 allocated to one another to form a pair are thus placed closer to the central axis of the traversing tube RO2 than the first roller pair W11/W12. The third roller pair W31/W32, finally, comprises a through opening compared to the second roller pair W21/W22 whose clearance is in turn reduced compared to the inside diameter of the preceding through opening of the preceding, second roller pair W21/W22. Since the haul-off speed of the roller pairs W11/W12, W21/W22, W31/W32 simultaneously increases in the throughput direction AZ1 per roller pair successively, a pulling is exerted on the tube RO2 along the rolling path and, thus, the tube is simultaneously lengthened. For example, it can be expedient to lengthen the tube per rolling event by approximately the same percentage with reference to its length before the rolling process as it is compressed per rolling event in the radial direction with reference to its outside diameter before the rolling process. As a result thereof, the wall thickness of the tube remains, in particular, essentially constant during rolling. Viewed overall, a reduction of the annular wall cross sectional area of the tube RO2 is achieved during the rolling as a result of the simultaneous interaction of the transverse pressing and lengthening of the tube.

The tube RO3 is brought to the prescribable ultimate dimensions with the assistance of the rolling device. The completely shaped, particularly approximately circular-cylindrical tube RO3 can then preferably be suppled to further processing stages for cable manufacture or to a supply reel for being wound up. The apparatus for accomplishing these steps have been omitted from FIG. 6 for the sake of clarity.

Expediently, an elongated, preferably approximately circular-cylindrical supporting tube SR*, that is stationarily arranged, is introduced into the inside of the traversing tube RO1 proceeding from the input side thereof. The functioning and action of this supporting tube SR* preferably essentially correspond to those of the supporting tube SR of FIG. 1. The supporting tube SR* is preferably attached and fixed in the longitudinal location. It is schematically indicated in the left-hand half of FIG. 6. The tube SR* serves the purpose of supplying at least one light waveguide into the tube RO1 and particularly a plurality of light waveguides LW1–LWn. In FIG. 6, the tube SR* extends on an essentially straight line at least over the longitudinal extent of the welding region SB of the welding arrangement SA. The supporting tube SR* preferably projects into the tube approximately up to the output of the rolling device WV or, respectively, of the potentially following drawing device ZV in order to be able to introduce at least one light waveguide into the completely shaped tube RO3 only after the end of the rolling process. This course of the supporting tube SR* cannot be seen in the plan view of FIG. 6. The supporting tube SR* advantageously opposes a lateral, particularly radial escape or buckling of the respective light waveguide LW1–LWn with reference to the central axis of the tube, since it prescribes a defined, particularly essentially straight-line running path for the respective light waveguide. The tube SR* thus offers a lateral, particularly a radially effective support for the light waveguide LW1–LWn (with reference to the longitudinal extent of the tube RO1). As a result of the prescription of the running path with the assistance of the supporting tube SR*, defined relationships between the production length of the tube RO3 and the introduced length of the respective light waveguide are largely assured in an advantageous way.

In order to potentially be able to also introduce a filling compound FM into the completely shaped tube RO3 in addition to or independently of the light waveguides LW1–LWn, an elongated filling or guide tube FR* is provided that is introduced into the inside of the tube RO1 proceeding from the input side. The function and action of this filling tube FR* preferably essentially correspond to those of the filling tube FR of FIG. 1. This filling tube FR* is preferably attached stationary in longitudinal location and is expediently arranged at the outside around the supporting tube SR* and spaced therefrom so that an annular gap channel is formed between the supporting tube SR* and the filling tube FR*. The filling tube FR* proceeds at least past the welding region SB of the welding arrangement SA and has an essentially straight-line longitudinal course, which is additionally indicated dot-dashed in the plan view of FIG. 6. In particular, the filling tube FR* concentrically surrounds the supporting tube SR*, so that a coaxial tube arrangement of supporting tube SR* and filling tube FR* is formed. The supporting tube SR* as well as the filling tube FR* preferably comprises an essentially approximately circular-cylindrical shape, so that an essentially annular gap channel RS therebetween (see FIG. 7). The output side or end of the filling tube FR* preferably ends before the end of the supporting tube SR* at the output side, for example, the supporting tube SR* has its end projecting beyond the output of the filling tube FR*. Therefore, it is assured that, viewed in the haul-off direction AZ1, the filling compound FM is first introduced into the tube RO2 before the light waveguides LW1–LWn are added thereto. What is advantageously enabled, for example, in this way is that the light waveguides LW1–LWn can be dragged into the finished tube RO3 by the filling compound FM. The filling tube FR* preferably extends roughly into the middle of the longitudinal extent or at most up to the output of the rolling device or mill WV. Compared thereto, the supporting tube SR* preferably ends somewhat later as viewed in the haul-off direction AZ1 such as, for example, following the output of the rolling device WV or only after the drawing device ZV. With the assistance of the filling tube FR*, the filling compound FM is introduced into the tube RO2 at a time before the tube RO2 has been brought to its smallest, final diameter. Assured as a result thereof is that the filling compound FM essentially completely fills the inside of the completely shaped tube RO3 after the completion of the rolling process and the potentially following drawing process. A material or a coating having high temperature resistance is preferably employed for the supporting tube SR* and/or the filling tube FR*, since the supporting tube SR* as well as the filling tube FR* are conducted under the welding location SS in the tube RO1. A metallic material, particularly hard-drawn or, respectively, hardened stainless steel is preferably selected for the material of the supporting tube SR* and/or the filling tube FR*.

The cooled solid body KK of the welding arrangement SA in FIG. 6 (also see FIG. 7) is formed by two separate cooling blocks FB1, FB2 that enclose the tube RO1 passing therebetween in the haul-off direction AZ1 from the outside between their long sides clamp-like. The two cooling blocks FB1, FB2 are respectively preferably fashioned solid and each respectively approximately comprise a tuboid shape to form a cooled solid body. A longitudinal gap or, respectively, longitudinal slot SL1, which proceeds essentially on a straight line and that preferably extends over the entire length of the cooling body KK, is kept free on the upper side of the cooling body or cooled solid member KK. The two band edges BK1, BK2 to be welded to one another remain freely accessible from the outside for the welding process along this longitudinal gap or slot SL1. Corresponding to this longitudinal gap SL1, the cooling member KK comprises an analogously fashioned longitudinal gap or slot SL2 at its underside between the two cooling blocks FB1, FB2, this proceeding approximately congruently with the longitudinal gap SL1 in the plan view of FIG. 6 and is only visible in the cross sectional view of FIG. 7. Except for the two outwardly open longitudinal gaps SL1, SL2, the two cooling blocks FB1, FB2 contact the tube RO1 at the outside circumference thereof over the longitudinal extent of the welding region SB. Expressed in other words, the cooling member KK thus comprises a longitudinal passage or through opening DU with a prescribable cross section for the traversing tube RO1. A through longitudinal gap SL1/SL2 from top to bottom thus remains between the two bipartite cooling blocks KB1, KB2. The longitudinal passage DU between the two cooling blocks FB1, FB2 is indicated in dot-dashed lines in FIG. 6. Expediently, the cooling member KK contacts at least 60%, particularly in a range between 60 and 90%, and preferably about 75% of the outside circumference of the metallic tube.

Figure 7:
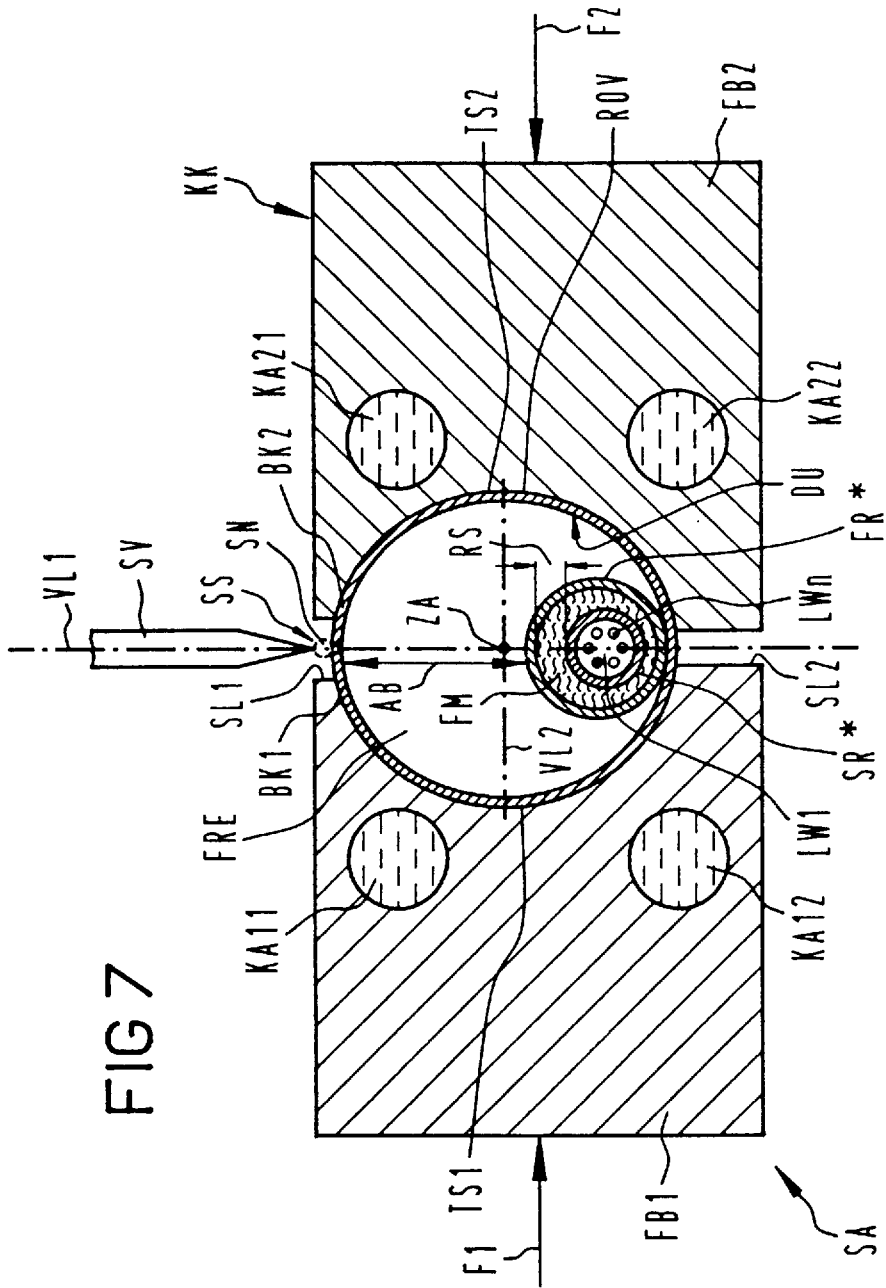
FIG. 7 is a cross sectional view taken along the lines VII—VII of FIG. 6.

A preferably approximately circular-cylindrical through bore BO for the passage DU is provided in the cooling member KK perpendicular to the plane of the drawing of FIG. 6, for example at the upper side of the cooling member KK, in order to offer an adequately large free space for welding the two band edges BK1, BK2 at the welding location SS and in order to make the two abutting band edges BK1, BK2 of the tube RO1 outwardly accessible for the welding device SV (see FIG. 7). The through bore BO, as viewed in the haul-off direction AZ1 in FIG. 6, is let into the cooling member KK at a prescribable sub-length D1 of the input side, preferably after about the first third of the longitudinal extent of the cooling member KK. The cooling member KK preferably comprises an overall longitudinal extent D1+D2 of between 100 and 200 mm, and preferably between 100 and 120 mm. The bore BO preferably begins at a spacing or, respectively, a sublength of between 30 and 50 mm from the end face of the cooling member KK at the input side (as viewed in the haul-off direction AZ1).

In this way, the tube RO1 is already cooled with the assistance of the cooling member KK before the actual weld location SS (as viewed in the haul-off direction AZ1), in the near region of the welding location SS itself as well as immediately following the welding location SS. This coating is enabled by the outside wall of the tube at both sides of the longitudinal slot SL1 being only contacted with a solid body and not with a coolant fluid such as, for example, water. Given the solid cooling member KK, the outside surface of the tube remains essentially clean as well as dry, particularly at least in the region of the longitudinal slot SL1 along the band edges BK1, BK2 of the tube to be welded to one another. By drawing the tube through the cooling member KK, moreover, the band edges BK1, BK2 of the tube to be welded to one another are not outwardly as well as inwardly contacted or touched along the longitudinal slot SL1. For example, no contact occurs between the band edges BK1, BK2 to be welded to one another or, respectively, the weld SN that has been formed with component parts of the cooling member KK or of the filling tube FR*. In addition, the band edges BK1, BK2 or, respectively, the weld SN remain uncontacted at the inside wall as well as at the outside wall of the tube. Negative influences on the molten material of the weld SN, for example, due to additives or, respectively, contaminants with coolant fluid, particularly water drops, as well as disturbances to the welding atmosphere, for example, due to enrichment with water or steam, are avoided from the very outset. Since the tube is contacted by the cooling member KK at the outside circumference not only following the actual welding location but already before as well as at the actual welding location itself, an especially large contacting area for eliminating heat is also offered overall and, thus, an especially effective cooling is enabled. Inadmissible thermal stresses of the filling compound FM and/or the light waveguides LW1–LWn in the tube when the tube RO1t is conducted through the welding region SB are thus largely avoided. In particular, the tube can be pre-cooled before the actual welding location SS along the sub-section D1 of the cooling member KK at the input side without the outside surface thereby becoming wet or, respectively, damp or being contaminated in some other way, particularly in the region of the band edges BK1, BK2, which is to be welded to one another. Proceeding from the welding location SS at least up to its solidification, the molten material of the weld SN of the tube is neither contacted with a cooling fluid nor in any other way when being drawn through the cooling member KK. Following the welding location SN, namely, the weld SS remains freely externally accessible along the sub-section D2 at the out put side of the longitudinal slot SL1 of the passage DU (of the cooling member KK). An embrittlement of the material or formation of an oxide along the weld SN that has been formed is largely avoided in this way. If, by contrast thereto, cooling were carried out at and/or following the welding location SS with a fluid coolant such as, for example, with water in a cooling basin, then an undesirable embrittlement of material or other damage to the weld SN would usually occur.

In particular, the cooling member KK lies against the outside tube wall with a dry contacting surface, and the tube is preferably drawn through the cooling member KK in its dry condition.

As a result of the longitudinal gaps SL1, SL2 between the two cooling blocks FB1, FB2, it becomes possible to press these blocks FB1 and FB2 together with a prescribable transverse pressing force trans-axially relative to the longitudinal extent of the tube RO1, and the forces are indicated by arrows F1, F2, which are directed toward one another in FIG. 6. The transverse pressing thereby particularly occurs in a plane that lies approximately perpendicular to the longitudinal extent of the tube RO1 and whose privileged direction, when viewed in the cross sectional view of FIG. 7, proceeds to the center ZA of the tube RO1 as well as essentially parallel to an imaginary connecting line of the band edges BK1, BK2 residing opposite one another. For example, the pressing of the forces, F1, F2 proceeds approximately parallel to that tangent that proceeds approximately through the welding location SS in the middle between the two band edges BK1, BK2 at the outside circumference of the tube RO1. In the cross sectional view of FIG. 7, this privileged direction for the transverse pressing forces is indicated with the assistance of a dot-dashed straight line VL2 that is entered essentially horizontally therein. Due to the transverse pressing, a tube seam gap pressure is generated for the longitudinally slotted tube RO1 and the band edges BK1, BK2 residing opposite one another are pressed together, so that they abut one another flush and the longitudinal slot LS is closed. The two band edges BK1, BK2 of the tube RO1 are thus placed butted against one another and contact one another in the cooled solid member KK at the welding location SS (see FIG. 7). The touching band edges BK1, BK2 are then welded to one another with the assistance of the welding device SV, particularly a welding electrode or a laser at the welding location SS so that the weld SN is formed. Expediently, a protective atmosphere, particularly inert gas such as, for example, argon, helium, etc., . . . , is employed in the region outside and around the welding location SS for welding the tube, so that an oxide formation on the produced weld SN is largely avoided.

When the two band edges BK1, BK2 of the tube RO1 are welded to one another at the welding location SS to form the weld SN, then the weld SN remains freely accessible toward the outside throughout because of the gap SL1. What is thereby advantageous is that the molten material of the weld SN is not subsequently abraded off or is not disturbed or even damaged in some other inadmissible way when the tube is continued to be pulled through the cooling member KK. The cooling member KK thus does not come into contact with the weld SN of the tube along the longitudinal slot SL1, so that the molten material of the weld SN can solidify largely uninfluenced. For the inside, too, the weld SN has no contact with component parts of the cooling member KK or of the filling tube FR* (see FIG. 7). Further, the re-approach to the production line is facilitated by the annular gap SL1. The welding device SV allocated to the welding location SS, namely, can expediently be allocated to a longitudinal location for the approach that lies following the welding location SS in the haul-off direction AZ1 and at which a weld was already been formed before the stopping of the production line. A gap-free welding is simply enabled in this way. In that the longitudinal slot LS of the tube RO1 to be welded lies on top when passing through the welding arrangement SA, for example, at the upper side of the tube RO1, moreover, a running of the molten metal of the molten material in circumferential direction on the outside surface of the tube is largely avoided at the welding location SS. In this way, losses of material and an inadmissible reduction in the wall thickness resulting therefrom along the weld are largely opposed.

In a schematic cross section view, FIG. 7 shows the welding arrangement SA of FIG. 6 through the bore BO perpendicular to the plane of drawing of FIG. 6 as well as with a direction of view in the haul-off direction AZ1. An imaginary connecting line VL1 is also entered as a dot-dashed line in FIG. 7, this line VL1 proceeds through the weld SN approximately in the middle of the longitudinal gap SL1 at the upper side of the tube and through a location in the middle of the longitudinal gap SL2 on the underside of the tube that is offset by about 180° at the outside circumference relative thereto. The two cooling blocks FB1, FB2 are respectively essentially allocated to a sub-half of the outside circumference of the tube on both sides of this imaginary symmetry or, respectively, connecting line VL1 that proceeds vertically through the center ZA of the tube in FIG. 7. Specifically, the cooling block FB1 is allocated to the left-hand half of the tube as viewed in the haul-off direction AZ1 and the cooling block FB2 is allocated to the right-hand sub-half thereof. The two cooling blocks FB1, FB2 are respectfully fashioned as a half-shell at their side facing toward the tube, for example, they respectfully comprise a recessed TS1 or TS2 with a prescribable inside contour that respectively embrace the tube at both sides of the imaginary connecting line VL1. The cooling blocks FB1, FB2 are arranged to be opposite one another at the outside circumference of the tube so that the imaginary connecting line VL2 indicates the centers of the recesses TS1, TS2 and proceeds perpendicular to the imaginary connecting line VL1 in the cross sectional view of FIG. 7. Then, the weld SN has approximately the 12 o'clock position at the outside circumference of the tube allocated to it, whereas the centers of the recesses TS1, TS2 are offset by 90° thereto. In detail, the middle of the recess TS1 has roughly the 9 o'clock position allocated to it and the middle of the recess TS2 has roughly the 3 o'clock position allocated to it. The inside contour of the recess TS1 as well as the inside contour of the recess TS2 are respectively preferably inwardly arced in the form of a sub-circular segment being arced into the inside of the appertaining cooling block FB1, FB2. In this way, the two cooling blocks FB1, FB2, when combined, form a through opening with a prescribable cross section particularly with an ellipsoid or, respectively, highly oval cross sectional shape for the traversing tube.

The two cooling blocks FB1, FB2 are trans-axially pressed together with respect to the longitudinal extent of the tube passing through in a haul-off direction AZ1, and the blocks are pressed together with a privileged forced direction along the imaginary straight line VL2, which forces are indicated by the arrows F1, F2. Since the cooling blocks FB1, FB2 press the two sub-halves of the tube together at both sides of the weld SN, the tube is pinched together or, respectively, compressed at both sides of the imaginary connected line VL1, so that an oblong cross sectional shape occurs for the tube, i.e. the cooling blocks FB1, FB2 simultaneously act as shaping blocks. The tube plastically deformed by the transverse pressing in the welding arrangement thus comprises a greater extent along the imaginary connecting line VL1 and along the imaginary connecting line VL2 and, in other words, the tube is shaped higher than wide. Due to the transverse pressure forces exerted by the cooling blocks FB1, FB2 onto the outside walls of the previously essentially circular-cylindrical tube at both sides of the weld SN, this tube is reshaped or, respectively, pressed into a highly oval tube ROV (see FIG. 4). The oval shape of the tube ROV is thus particularly produced in that the shaping blocks FB1, FB2 exert a transverse pressing power with privileged direction along the imaginary connecting line VL2, which proceeds approximately horizontally in the cross sectional view of FIG. 7 onto the outside wall of the tube ROV. This transverse pressing power along the connecting line VL2 thereby acts radially inward onto the central axis of the tube ROV.

Since the two cooling blocks FB1, FB2 have their long sides facing toward one another pressing essentially flush, i.e. particularly like a positive lock against the outside circumference of the highly ovally shaped tube ROV, an especially effective heat transmission from the tube ROV onto the cooling member KK derives, so that the molten heat is designationally eliminated from the welding location SS into the cooling member KK. A material having especially high thermal conductivity such as, for example, a metallic material is expediently selected for the shaping blocks FB1, FB2. A material is expediently employed for the cooling member KK that comprises a high dry-glide property, for example, a material that is especially low in friction, so that a seizing of the tube when being drawn through the through opening DU of the cooling member KK is largely avoided. As warranted, it can also be expedient for reducing the friction between cooling member KK and tube to provide the contacting surface of the cooling member KK with a lubricant, whereas the tube remains clean along the longitudinal slot SL1.

In that at least one solid cooling member or cooled solid body contacts the tube in the welding region, an effective cooling of the tube is already enabled thereat. Negative influences on the manufacturing quality of the metallic tube equipped with at least one light waveguide and/or filling compound are thus largely avoided. Thus, for example, a thermal overheating or damage to the material of the plastic coating of a light waveguide potentially connected therewith and/or of a filling compound are already opposed where the greatest welding heat occurs. The release of hydrogen by splitting such as, for example, from the filling compound, the plastic coating of the respective light waveguide, a potential damp ambient air, and the molten metal at the welding location SS of the tube, etc., is also reduced, i.e. becomes far less possible. Since only a cooled, dry solid member contacts the tube in the dry condition, and not a coolant fluid, such as, for example, water disturbances to the welding atmosphere such as, for example, due to enrichment with water steam or hydrogen, as well as deteriorations of the molten material in the region of the welding location SS are largely avoided. It is thus the solid cooling member that makes it possible to also be able to faultlessly cool the tube before the actual welding location as viewed in the haul-off direction, even at the welding location itself and/or immediately after the welding location, whereby the molten material of the weld itself remains uncontacted. In particular, an embrittlement of the material as well as other deteriorations of the weld are largely avoided since the molten material does not come directly into contact with a fluid coolant in the welding region SB before, at and/or after the actual welding location SS itself but can solidify largely uninfluenced.

In FIG. 7, the filling tube FR* together with the supporting tube SR* are preferably arranged approximately centrally therein and extend along that inside wall of the oval tube ROV. The tubes SR* and FR* lie approximately 180° opposite the weld SN, and the filling tube FR* runs along at the floor of the tube ROV in the region at the 6 o'clock position in the cross sectional view of FIG. 7. As a result thereof, the molten material of the weld SN also remains uninfluenced proceeding from the inside, i.e. without contact with the filling tube FR*. As a result of the highly oval shape of the tube ROV, the spacing AB between the weld SN and the filling tube FR* along the connecting line VL1 is enlarged compared to a tube that is shaped circular-cylindrical. The spacing AB between the filling tube FR* and the weld SN is expediently selected at least equal to 0.5 mm, and preferably between 0.5 and 3 mm. Since metallic tube ROV is shaped highly oval in the welding region SB of the welding arrangement SA of FIG. 6 and is higher than wide, an especially large distance is thus assured between the filling tube FR* and the welding location SS with the welding device SV. The filling tube FR* surrounds the supporting tube SR* spaced therefrom so that the annular gap channel RS for the delivery of the filling compound FM is formed between the outside surface of the supporting tube SR* and the inside surface of the filling tube FR*. A thixotropic, soft, pasty material is preferably selected as a filling compound FM in order to be able to make the finished tube RO3 largely longitudinally water tight. The annular gap channel RS is essentially annularly fashioned. Viewed in the circumferential direction, the gap RS has an essentially constant gap width. The gap width of the annular gap channel RS is preferably selected to be at least equal to 0.2 mm, preferably in a range of between 0.2 and 1 mm. It can also be potentially especially expedient to have the supporting tube SR* run along at the floor of the filling tube FR*, so that the tube SR* is at a particularly greater distance from the weld SN and from the welding location SS. The gap space FRE between the outside wall of the filling tube FR* and the inside wall of the tube ROV is preferably filled with a protective atmosphere, particularly an inert gas, in the welding region SB. As a result of this inert gas flowing in the inside of the tube, an oxide formation at the inside of the weld SN is largely advantageously opposed. What is thereby also largely avoided is that hydrogen, which is potentially released at the welding location SS, is entrained from the outside into the tube in the haul-off direction AZ1.

In addition to the act of cooling with the assistance of the cooling member KK from the outside, the welding arrangement SA thus also advantageously offers means in the welding region SB for the thermal insulation or, respectively, shielding of the filling compound FM and/or of the light waveguides LW1–LWn in the inside of the traversing tube. In detail, a thermal shielding effect toward the inside is effected for the filling compound FM and/or the light waveguides LW1–LWn, preferably by the following measures.

The inside diameter of the tube RO1 to be welded is preferably selected larger than the inside diameter of the completely shaped tube RO3 of FIG. 6. The inside diameter of the tube RO1 to be welded is preferably selected at least 10% larger and preferably about 50% larger than the inside diameter of the tube RO3 after the rolling process or, respectively, after the following cross sectional reduction with the drawing device ZV.

In addition thereto or independently thereof, the tube RO1 is shaped or, respectively, pressed to a highly oval tube between the two shaping blocks FB1, FB2 in the welding region SB in order to achieve an optimally great distance AB of the welding location SS from the filling tube FR* with the filling compound FM. As a result thereof, the filling tube FR* proceeds in the haul-off direction AZ1 along the floor of the highly ovally shaped tube ROV at the inside wall of the tube ROV lying opposite of the welding location SS, and the spacing between the welding location SS and the thermally sensitive material is enlarged even more. The thermal heat radiation proceeding from the weld SN decays all the more greatly the farther the filling tube FR* and the supporting tube SR* are removed from the welding location SS. The gap space FRE thus assumes the function of a first thermal shielding layer or, respectively, shielding sheath.

Viewed from the outside toward the inside, the cladding of the filling tube FR* forms a second thermal barrier or, respectively, heat barrier, so that the filling compound FM is largely thermically shielded in the welding region SB. Inadmissibly high thermal stresses, overheatings as well as damages to the material of the filling compound FM potentially occurring therefrom are thereby largely avoided. As a result thereof, the filling compound FM retains its characteristic material property such as, for example a high viscosity, pieced-like consistency, etc. This also largely opposes a release of hydrogen from the filling compound FM. The gap space FRE as well as the metallic cladding of the filling tube FR* thus forming two thermal insulating sheaths for the filling compound FM. In particular, the combination of gap space FRE and filling tube FR* enables a temperature drop of about 800° C. through 1200° C., particularly around 1000° C. Whereas the band edges of, for example, a stainless steel tube ROV can preferably be heated to temperatures up to about 1500° C. at the welding location, the filling compound FM is, in particular, at most heated to 300° C. It can also be potentially expedient to additionally cool the filling tube FR*.

The filling compound FM in turn itself acts as thermal shielding for the light waveguides LW1–LWn in the supporting tube SR*. To that end, the filling compound FM is preferably pumped into the annular gap channel RS at room temperature, particularly cooled. The filling compound FM thus acts as a further or third thermal barrier as viewed from the outside toward the inside that sees to a further temperature drop. Since the supporting tube SR* is embedded within the filling compound FM of the filling tube FR*, the cladding of the supporting tube SR* offers a fourth thermal insulating layer for the light waveguides LW1–LWn. The multi-layer, particularly four-layer thermal insulation and, thus, an especially effective thermal shielding is formed for the light waveguides LW1–LWn in this way. Potential, inadmissibly high thermal stresses or an overheating of the plastic coating material or coating of the light waveguides are thus largely avoided. In particular, a fractioning of hydrogen from, for example, the coating material of the light waveguides is thereby particularly also largely opposed. Whereas, in particular, the tube ROV can be heated to temperatures up to approximately 1500° C. at the welding location SS, the light waveguides LW1–LWn are advantageously at most heated to approximately 200° C. It can be potentially expedient to additionally cool the supporting tube.

In that, first, the tube itself is cooled at its outside circumference at both sides of the weld SN along the welding region SB and, on the other hand, thermally shielding leads are also offered in the inside of the tube for the filling compound FM and/or the light waveguides, a release of hydrogen from the filling compound and/or from the plastic coating of the light waveguides is particularly reliably opposed. As a result thereof, increases in the attenuation of the light waveguides LW1–LWn in the finished tube RO3 are largely avoided. Since the filling tube FR* for the filling compound FM as well as the supporting tube SR* for the light waveguides LW1–LWn respectively form a separate, hermetically sealed lead in the inside of the tube, at least over the welding region SB, an entrainment of hydrogen potentially released outside into the inside of the finished tube RO3 is largely avoided.

Without such protective measures, by contrast, difficulties would arise due to the welding heat because the heat in the region of the welding location would too highly thermally stress or even damage the inside of the tube with the light waveguides and/or the filling compound. Thus, for example, there would be the risk that an admissibly high thermal load and, thus, damage to the material or even a partial burning of the filling compound and/or of the plastic coating of the light waveguides occurs. In addition, the welding process would also be critical because the topical overheating can release hydrogen. Such hydrogen, for example, could be released from the damp ambient air, when melting the metallic tube, from the filling compound and/or the plastic coating of the light waveguides. In addition, it could also occur that the hard ultraviolet radiation arising during the welding would break electron bonds in the filling compound and/or the plastic material of the light waveguide and hydrogen would, therefore, become free. If such hydrogen were potentially entrained into the inside of the completely welded tube that is tight on all sides, then it would remain therein and lead to an undesired rise in the transmission attenuation of the light waveguides.

In practice, the following measures are particularly expedient for the welding of the metallic tube, these being respectively capable of being employed individually or in arbitrary combination with one another for the inventive welding arrangement:

1. A significantly larger diameter, particularly a diameter that is approximately 50% larger is selected for the tube RO1 of FIG. 6 to be welded than for the completely shaped tube RO3. The reduction in diameter thereby particularly ensues by rolling and/or drawing with the rolling means WV of FIG. 1 or, respectively, 6 and/or the drawing means ZV.

2. For the welding process, the tube RO1 is preferably shaped or, respectively, pressed highly oval in order to achieve a relatively great spacing AB of the welding location SS from the thermally sensitive materials such as the filling compound FM and/or the light waveguides LW1–LWn.

3. The tube ROV is expediently cooled on approximately all sides proceeding from the outside in the region of the welding location SS, being cooled by water-cooled final shaping members such as, for example, FB1, FB2. These shaping blocks are, in particular, pressed against the tube ROV with corresponding pressure (See F1, F2) in order to be able to advantageously eliminate as much welding heat as possible, and in order to be able to simultaneously generate the tube joining gap pressure between the two band edges BK1, BK2 of the tube ROV required for the welding process.

4. The thermally sensitive materials such as, for example, the filling compound FM and/or the light waveguides LW1–LWn are expediently thermally shielded by protective tubes such as, for example, the filling tube FR* and/or the supporting tube SR* and are also preferably additionally conducted past and under the welding location SS with optimally great spacing AB therefrom in the metallic tube ROV.

At least respectively one cooling channel for a coolant is expediently let in the inside of the respective cooling block FB1, FB2. In the plan view of FIG. 6, the cooling channel KA11 is indicated in dot-dashed lines for the cooling block FB1 and the cooling channel KA21 is indicated by way of dot-dashed lines for the shaping block FB2. The respective cooling channel such as, for example, KA11 or, respectively, KA21 preferably extends approximately parallel to the longitudinal axis of the traversing tube RO1. It is respectively arranged at a prescribable distance from the contacting surface of its appertaining cooling block with which the latter lies against the outside circumference of the tube. Each cooling channel such as, for example, KA11 of the cooling block FB1 is connected to a cooling device KV1 via a conduit L11 that supplies it with a coolant, particularly water. The warmth or, respectively, heat generated by the welding process at the welding location SS is directly transmitted from the metallic tube RO1 onto the cooling blocks FB1, FB2. The tube RO1, namely, is trans-axially clamped between the two side walls of the cooling blocks FB1, FB2 in the welding region SB, whereby the cooling blocks FB1, FB2 preferably enclose the tube RO1 between themselves with close adjacency and contact it in the nature of a positive lock. As a result thereof, a high heat transfer from the tube RO1 heated by the welding process at the welding location SS onto the contacting surfaces of the cooling blocks FB1, FB2 is effected. With the assistance of the coolant in the respective cooling channel such as, for example, KA11, the welding heat is continuously eliminated toward the outside from the cooling block FB1 via a conduit L11* to a cooling mechanism KV1 in which the heated coolant is in turn cooled. In this way, the cooling channel KA11 sees to a constant heat elimination from the shaping block FB1. The same is analogously true of every cooling channel such as, for example, KA21 in the shaping block FB2. The cooling channel KA21 in the plan view of FIG. 6 is connected to a separate cooling device KV2 via a conduit L21. The heated coolant is thereby supplied via a conduit L21* from the shaping or, respectively, cooling block FB2 to the cooling device KV2 for continuous cooling. It can also be potentially expedient to connect the cooling channels of the two shaping blocks FB1, FB2 as well as their appertaining delivery as well as discharge conduits to one or a common cooling device and to circulate the coolant in common.

In the cross sectional view of FIG. 7, the inside of the cooling block FB1 also additionally comprises the cooling channel KA12 in addition to the cooling channel KA11. Whereas the cooling channel KA11 is allocated to the upper half of the cooling block FB1, the cooling channel KA12 is formed into the lower half of the cooling block FB1. Analogous thereto, the cooling block FB2 also comprises a cooling channel KA22 in its lower sub-half in addition to the cooling channel KA21 in its upper sub-half. The four cooling channels preferably extend parallel to one another over the longitudinal extent of the cooling member KK (see FIG. 6). The two cooling blocks FB1, FB2 are, in particular, fashioned axially symmetrically with respect to the imaginary connecting line VL1.

Of course, it can also be potentially expedient to combine more than two cooling blocks to form a cooling member under transverse pressure with a through opening with a prescribable inside cross sectional shape that is impressed on the traversing tube. In addition, it can also be potentially adequate to provide only one solid cooling member fashioned of one piece that comprises a through opening with a prescribable inside cross section. To that end, the through opening can expediently taper conically in the throughput direction.

After solidification of the molten bath of the weld SN, it can be potentially expedient to additionally spray the white-hot weld SN with a liquid coolant, particularly water drops, after leaving the cooling member KK. To that end, a cooling device WSP that is indicated by dot-dashed lines in FIG. 6 is additionally provided between the welding arrangement SA and the following rolling device WV. It particularly serves for wetting or, respectively, spraying the weld SN that has already solidified but is still white-hot with a coolant, particularly microscopically small drops of water. Only after the solidification of the molten bath of the weld SN has this itself expediently been cooled to such an extent that the outside surface of the weld SN returns to the original or starting color. A formation of an oxide layer on the weld is thereby advantageously opposed. The water steam that is formed is thereby completely extracted from the outside surface of the tube insofar as possible with the assistance of an immediately following extraction means ASV. This extraction means ASV is likewise indicated by dot-dashed lines in FIG. 6.

A welding arrangement according to the disclosed principle such as, for example, SA can, of course, also be advantageously utilized in production lines for light waveguide-equipped metal tubes other than that shown in FIGS. 1–7.

In the fabrication of metal tubes that are respectively equipped with at least one light waveguide, the longitudinal welding of the band edges together is particularly critical in practice. Given, for example, excessively imprecise guidance of the tube in the welding region, inadmissible disturbances or, respectively, deteriorations of the molten material of the longitudinal weld between the two band edges of the tube can occur. In addition, the welding heat emitted during the welding process can lead to an overheating of the tube and, thus, to the light waveguides and/or filling compound introduced therein.

Another problem is how the weld of a metal tube can be faultlessly fashioned during welding and how an overheating of the tube can be largely avoided at the same time. This problem is solved in an especially advantageous way in that at least one roller that is fashioned as a solid cooling member rolls off at the outside circumference of the traversing, metallic tube.

This makes it advantageously possible to guide the metallic tube in a precise, controllable way during the welding process and to simultaneously avoid an overheating of the tube and, thus, of the light waveguide and/or filling compound introduced into it. Given roll-off of such a roller on the outside wall of the tube, the frictional forces taking effect there are far lower than given the contacting of the outside wall only with a rigid, stationary cooling member that is suspended immobile.

Figure 8:
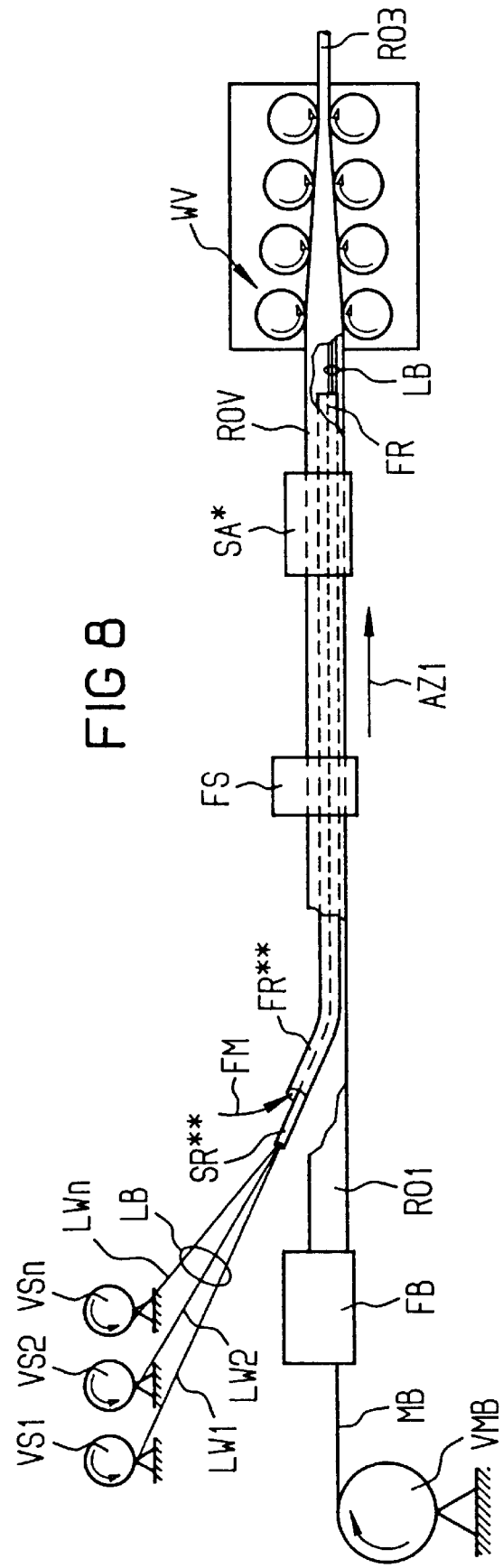
FIG. 8 is a schematic side view of a first sub-section of a modified production line for fabricating metal tubes equipped with light waveguides.

In a schematic overview, FIG. 8 shows the first sub-section of another production line for producing an optical transmission element OE (see FIG. 9) that is formed by a metallic tube equipped with at least one light waveguide. In the left half of FIG. 8, the initially preferably plain-faced or flat, elongated metal band MB is hauled off from a stationary supply reel VMB for this purpose and is continuously conveyed forward in the haul-off direction AZ1 along an approximately straight-line guidance path. In particular, either steel, preferably stainless steel, copper, aluminum or aluminum alloys, etc., is selected as the material for the metal band MB. This flat metal band MB is first continually shaped into the preferably approximately circular-cylindrical metal tube RO1 with the assistance of following shaping tools FB, particularly shaping rollers. This metallic tube RO1 has a longitudinal slot proceeding approximately on a straight line as viewed in the haul-off direction AZ1 and thus the tube is not entirely closed therealong.

Two tubes SR, FR, that are nested one in the other and, in particular, are arranged approximately coaxially, are introduced from the outside through this longitudinal slot into the inside of the metallic tube RO1. Function and action of this supporting SR as well as filling tube FR essentially correspond to those of the supporting tube SR* as well as filling tube FR* of FIGS. 6 and 7. The double arrangement of the two tubes SR, FR is stationarily attached, whereas the metallic tube RO1 is conveyed forward in the haul-off direction AZ1, essentially on a straight line. The inner tube SR as well as the outer tube FR preferably extends on the straight line in the inside of the metallic tube RO1, and at least until the longitudinal slot of the metallic tube RO1 has been longitudinally welded. To this end, the longitudinal slot of the metallic tube RO1 is mechanically largely closed after the introduction of the two tubes SR, FR with the assistance of a shaping unit FS, i.e. the band edges of the tube RO1 are placed in abutment insofar as possible and, finally, these abutting edges are longitudinally welded with the assistance of a welding mechanism SA* to form a welded tube ROV.

One or more light waveguides LW1–LWn in the form of a light waveguide bundle LB that are hauled off from stationary supply reels VS1–VSn are suppled to the input end of the inner tube SR. The light waveguides LW1–LWn are conducted in the inside of the tube SR essentially along the axial longitudinal extent thereof, and they are lent a defined, particularly essentially straight-line course, along a guidance path. At the same time, the premature wetting of the light waveguides with filling compound is avoided by the separate guidance of the light waveguides in the inner tube SR. As a result thereof, the light waveguides can slide along in the inside of the tube SR largely free of friction, and without being decelerated by the filling compound. It can potentially be expedient to place some glide fluid such as, for example, oil or graphite onto the light waveguides entering the inner tube SR and to thereby increase their gliding quality. The tube SR can thereby form a type of supporting tube for the light waveguides guided in it. As a result of the guidance, radial excursions or a lateral escape of the light waveguides LW1–LWn with reference to the longitudinal course of the inner tube SR are particularly largely avoided, so that defined admission conditions and, thus, admission lengths for the light waveguides LW1–LWn are determined. The inner tube SR is thereby preferably fashioned circular-cylindrical and is made of a metallic material, particularly steel, stainless steel or the like.

This inner tube SR is externally surrounded at a distance by the tube FR, so that a gap remains between the outside wall of the inner tube SR and the inside wall of the tube FR. When the outer tube FR surrounds the inner supporting tube SR approximately concentrically in particular, then an annular gap channel having an essentially constant gap width occurs. The filling compound FM is pumped through this inter space between inner tube SR and outer tube FR. The outer tube FR thus assumes the function of a filling tube for the separate introduction of the filling compound FM into the metallic tube RO1. The pumping of filling compound into the input-side end of the filling tube FR is merely indicated with an arrow in FIG. 8 for the sake of clarity. The filling tube FR** preferably comprises an essentially circular-cylindrical shape and is formed of a metallic material such as, for example, steel, stainless steel or the like. A standard cable core filling compound is preferably employed as the filling compound, and this advantageously comprising a somewhat pasty, soft consistency or gel and thus will allow for certain compensation or motion events of the light waveguides LW1–LWn in the finished optical transmission element OE. In particular, thixotropic filling compounds can also be utilized, these assuring an additional protection against water or against OH group diffusion.

In FIG. 8, the double arrangement of supporting and filling tube SR, FR extends to a point beyond the welding device SA*, as viewed in the haul-off direction AZ1. The supporting tube SR and the filling tube FR preferably end at approximately the same longitudinal location. Here, the light waveguides LW1–LWn as well as the filling compound FM leave their protective tube system, which is formed by the double arrangement SR, FR, and proceed with free mobility into the welded metallic tube ROV.

The delivery system formed by the inwardly disposed supporting or delivery tube SR as well as the filling tube FR arranged therearound particularly also serves the purpose of offering a thermal shielding or insulation for the filling compound FM and the light waveguides LW1–LWn in the region of the welding device SA* against the welding heat generated at the welding device. The supporting tube SR as well as the filling tube FR thereby each respectively form a guide channel that is tight on all sides and that proceeds through the welding region and protect the light waveguides as well as the filling compound against, in particular, thermal stressing in the welding region. The cladding of the filling tube FR already acts as thermal insulation for the filling compound FM. It is thereby particularly expedient to arrange or, respectively, guide the filling tube FR as well as the supporting tube SR** guided therein along an inside of the metallic tube RO1 that lies opposite the longitudinal slot to be welded. When, for example, the tube RO1 is closed from above with the assistance of the welding device SA*, then it is expedient to have the double arrangement of filling tube FR and supporting tube SR run along at the floor of the tube RO1 at the opposite inside wall. In this way, the distance between the welding device SA* and the filling tube FR or, respectively, the supporting tube SR is kept as large as possible, so that the intensity of the heat radiation generated by the welding process has already decayed somewhat at the location of the filling tube FR. An overheating of the filling compound FM is thereby largely avoided. In particular, a potential fractioning or splitting-off of hydrogen from the filling compound FM, which would otherwise potentially lead to a rise in the transmission attenuation of the light waveguides LW1–LWn is suppressed. Since the supporting tube SR is embedded inside the filling compound FM of the filling tube FR1, an even more effective thermal insulation or, respectively, barrier than for the filling compound FM itself is offered for the light waveguides LW1–LWn. The light waveguides LW1–LWn are then also additionally mechanically and thermally separated from the welding location by the filling compound FM as well as by the cladding of the supporting tube SR. In particular, the filling compound FM surrounds the supporting tube SR as a thermally insulating layer and thus prevents an inadmissibly great heating of the light waveguides LW1–LWn, and particularly a heating of their plastic coating (primary and secondary coating). To that end, it can already be adequate to pump the filling compound FM into the filling tube FR at room temperature. At the same time, the filling compound FM remains viscid, i.e. low-viscosity, in this case. In order to effect an additional cooling in the welding region, it can be especially expedient to pump the filling compound FM, which has been cooled below room temperature, into the inter space or, respectively, channel between the outside wall of the supporting tube SR and the inside wall of the filling tube FR. In this way, the light waveguides LW1–LWn can be conducted through the welding device SA* essentially faultlessly, i.e. without inadmissible overheating. In particular, a release of hydrogen such as, for example, from the light wave coating, from the filling compound FM or from the wall material of the supporting tube SR and/or of the filling tube FR is thereby particularly largely avoided. Since the light waveguides are conducted through the welding location of the welding device SA* and are thermally shielded by the supporting or, respectively, guide tube FR as well as the filling compound FM in the filling tube FR, the potential release of hydrogen during the welding process outside of the supporting as well as filling tube is avoided and the entrainment of hydrogen in the finished metallic tube ROV that is tight on all sides is also avoided. Such hydrogen, namely, can also be released when melting the metal of the band edges of the tube RO1. In addition, for example, damp ambient air can be split in the welding region and hydrogen is released. Since the filling tube FR and the supporting tube SR extend beyond the welding region of the welding device SA* in haul-off direction AZ1, a penetration of hydrogen into the inside of the welded tube ROV is effectively opposed.

Expressed in general terms, thus, additional component parts are provided between the welding location and the light waveguides or, respectively, the filling compound, as a result whereof the heat emission from the welding location can no longer penetrate unimpeded up to the filling compound as well as to the light waveguides. The filling compound and the light waveguides are thus not in direct contact with the actual welding location and can thus be reliably protected against inadmissibly high thermal stresses.

Immediately following the welding device SA*, the welded tube ROV is lengthened with the assistance of at least one rolling or, respectively, drawing means. This lengthening reduces the cross section to a desired ultimate dimension (outside diameter) and a desired cross sectional shape is impressed on the tube. The rolling device that is employed preferably corresponds in function and action to that of FIG. 1 and is referenced WV in FIG. 8.

For a better illustration, the welded metallic tube ROV is shown broken open in the region between the welding device SA* and the rolling device WV. The tube system of the supporting tube SR as well as the filling tube FR ends there.

Figure 9:
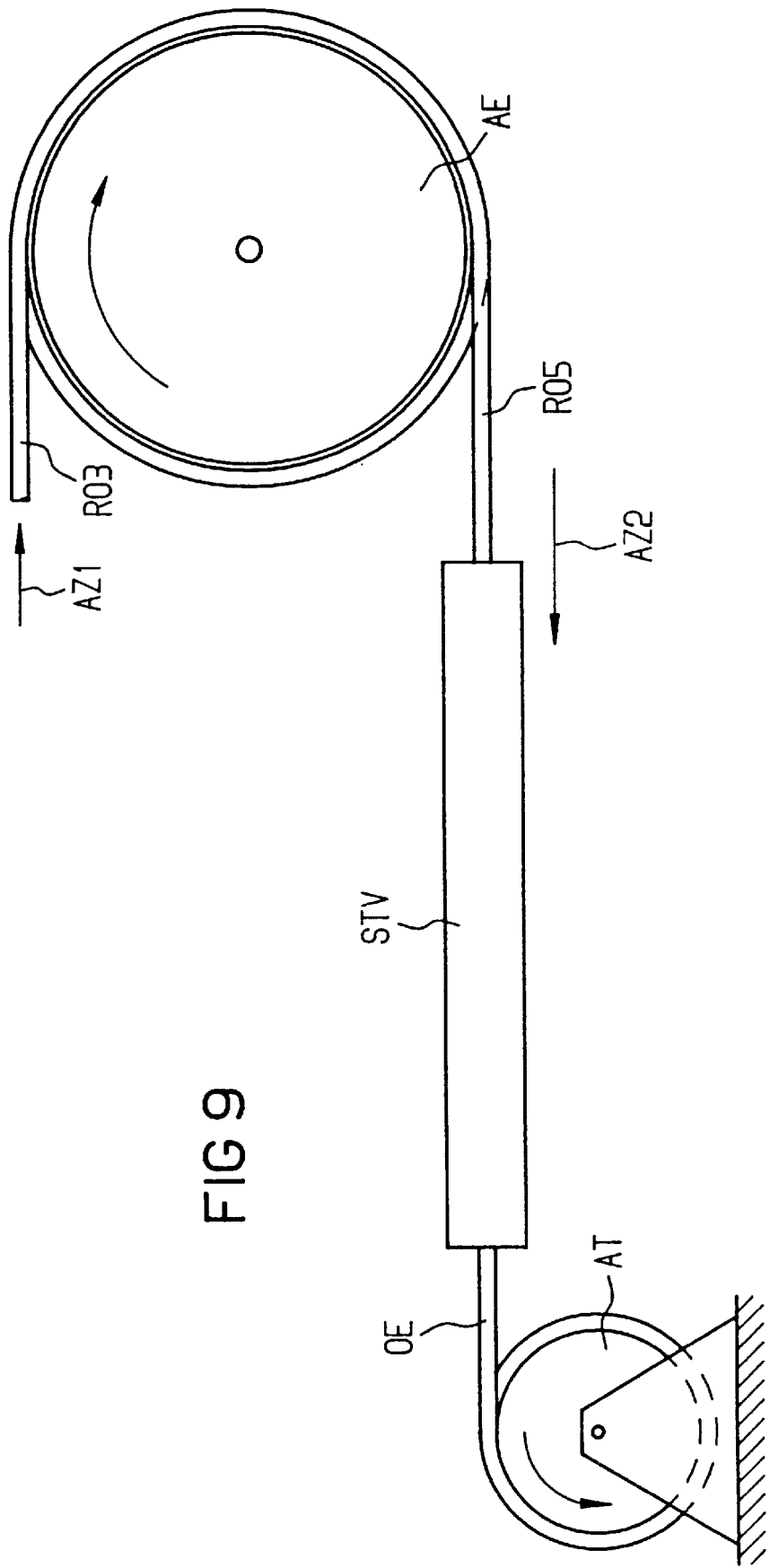
FIG. 9 is a schematic side view of a second sub-section of the production line of FIG. 8.

FIG. 9 shows the second sub-section of the production line of FIG. 8 that directly follows the first sub-section of FIG. 8. The metallic tube is referenced RO3 following the rolling process in FIG. 8. With the assistance of the deflection means AE of FIG. 9, the tube RO3 is deflected from the first, straight-line haul-off path (in the haul-off direction AZ1) into a new, second straight-line haul-off path (in haul-off direction AZ2). As shown in FIG. 9, the deflection means AE is preferably fashioned as a deflection roller. The tube RO3 is thereby advantageously deflected by an angle of approximately 180° from the original axial haul-off direction AZ1 into the opposite direction AZ2. The deflection roller is preferably driven and thus simultaneously acts as haul-off means for the metallic tube RO3. The tube RO3 is preferably looped one or more times around the outside circumference of the deflection means AE. As a result thereof, the light waveguides attempt to move out of the central axis of the tube RO3 into an inside path at the inside surface of the tube RO3. A defined position and, thus, length is thus allocated to the light waveguides. The loopings around the deflection means AE thereby assure that the light waveguides are largely prevented from being pushed back in a direction opposite the haul-off direction AZ1, i.e. a decoupling of the conveying of the light waveguides LW1–LWn along their approximately straight-line conveying path in the first sub-section of the production line of FIG. 8 from the conveying motion in the following, second straight-line conveying section in FIG. 9 is achieved. The deflected metallic tube is referenced RO5 in FIG. 9.

Following the deflection means AE, the metallic tube RO5 is supplied to an upsetting device STV that upsets the tube or, respectively, the metallic cladding RO5 by a prescribable amount compared to the length of the light waveguides LW1–LWn in a precisely controllable way, for example the length of the metallic cladding RO5 is reduced compared to the length of the light waveguides, so that the light waveguides come to lie in the finished optical transmission element OE with a certain excess length. The finished optical transmission element OE, finally, is wound onto a wind-up means AT, particularly onto a take-up drum.

Figure 10:
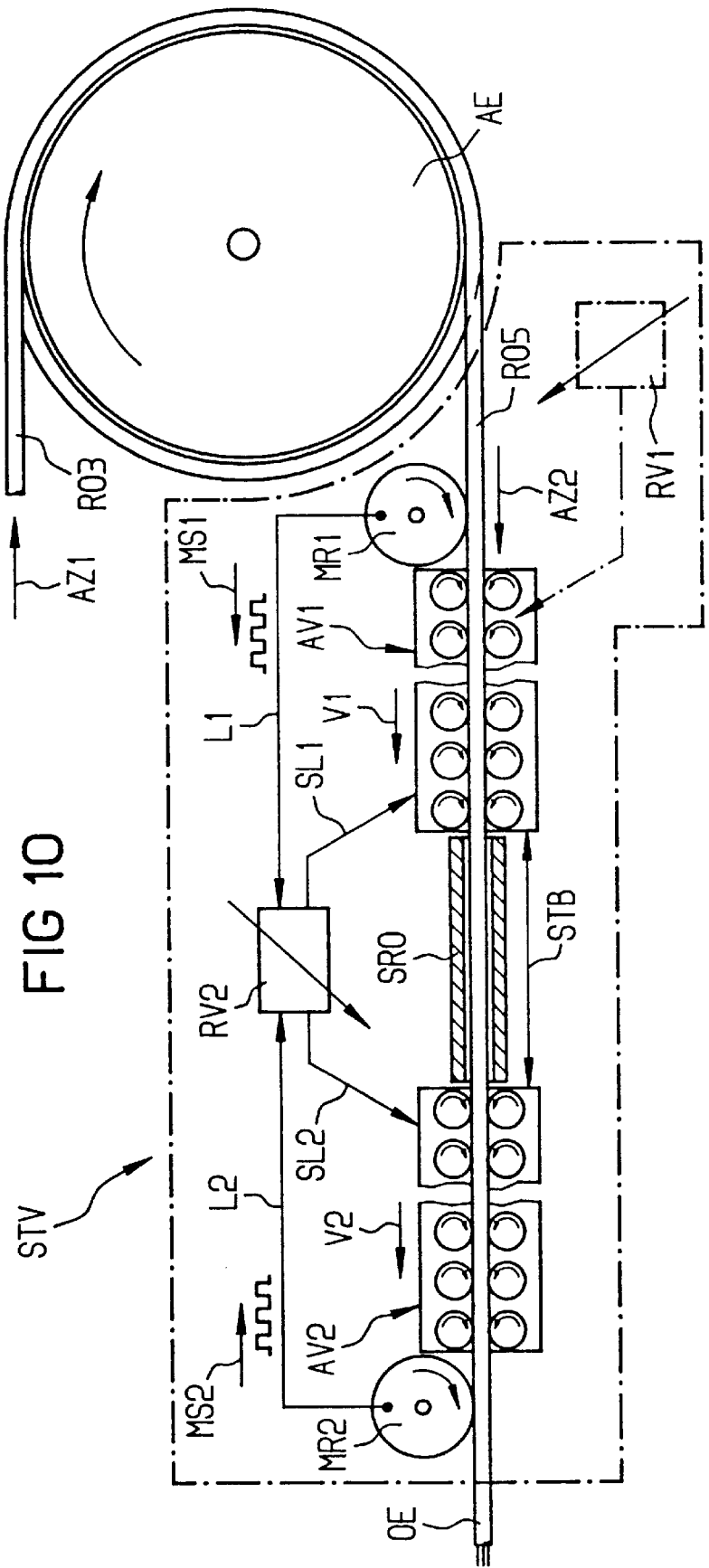
FIG. 10 is a schematic side view with portions broken away of the details of an upsetting device for the second sub-section of the production line of FIG. 9.

FIG. 10 shows a first exemplary embodiment of the upsetting means STV of FIG. 9. As viewed in haul-off direction AZ2, it comprises a first haul-off means AV1 at the input and a second haul-off means AV2 at the output between which the actual upsetting region STB extends. A supporting device in the form of an upsetting tube SRO is provided in this upsetting region STB between the two haul-offs AV1, AV2. A band or profiled roller friction haul-off is particularly employed for the respective haul-off means AV1 or, respectively, AV2. The upsetting tube SRO is preferably fashioned circular-cylindrical. In particular, it corresponds to the upsetting tube of German Patent 42 10 633. It preferably comprises a length between 0.1 and 0.5 meters, and preferably between 0.2 and 0.3 meters. A metallic material such as, for example, steel is preferably selected for the tube SRO. The tube SRO is fashioned optimally rigid, particularly optimally resistant to transverse pressure, so that it forms a stable guide for the metallic tube RO5 during the upsetting process. To this end, the tube SRO particularly comprises an inside diameter that essentially corresponds to the outside diameter of the entering metallic tube RO5.

The upsetting process for the metallic tube RO5 is continuously implemented along the axial conveying direction AZ2 with the assistance of the upsetting device STV of FIG. 9, being implemented in detail as follows:

The upsetting effect for the metallic tube RO5 is obtained by the tube RO5 being hauled off essentially on a straight line by the haul-off means AV1 of the input side and being pushed into the second haul-off means AV2. What this means in other words is that the haul-off means AV1 of the input side conveys more length of the tube RO5 into the upsetting region STB than the haul-off means AV2 of the output side conveys out of the upsetting region STB. The haul-off means AV2 at the output of the upsetting region STB thus seizes the metallic cladding RO5 with non-positive and/or positive lock as a decelerating haul-off, i.e. the haul-off means AV2 conveys the tube RO5 with a lower velocity V2 than the velocity V1 of the haul-off means AV1 at the input of the upsetting region STB. The thrust force of the haul-off means AV1 at the input and the counter-thrust force of the haul-off means AV2 at the output of the upsetting region STB resulting from this velocity difference V1–V2 then forms the upsetting force acting on the metallic tube RO5. It attacks the metallic tube RO5 within the upsetting region STB opposite the axial, particularly essentially straight-line conveying direction AZ2 and effects the axial upsetting thereof. As a result thereof, the metallic cladding of the tube is plastically shortened in a direction opposite to the straight-line haul-off direction AZ2 so that the light waveguides LW1–LWn come to lie in the upset metallic cladding or tube of the optical transmission element OE with a defined excess length. As a result of the upsetting process, the wall thickness of the upset metallic tube is increased compared to the unupset metallic tube of the optical transmission element OE, i.e. the outside diameter of the unupset metallic tube is enlarged by the upsetting process and the inside diameter thereof is diminished.

The haul-off means AV2 at the output side is preferably driven slower than the haul-off means AV1 of the input side by an amount corresponding to the desired excess length. A central, common control means, particularly a regulator RV2, is provided for setting the different velocities V1, V2 of the two haul-off means AV1, AV2, and this common control means correspondingly controlling the drives of the two haul-off means AV1, AV2 via appertaining control lines SL1, SL2. A setting possibility indicated by an arrow is provided at the central control means RS2 and allows different upsettings and, consequently, different excess lengths of the light waveguides LW1–LWn to be set corresponding to different velocities V1 and V2. In order to thereby regulate the upsetting as exactly as possible, the entry velocity of the metallic tube RO5 is measured before entry into the haul-off means AV1 of the input side with the assistance of a velocity measuring means MR1, particularly a measuring wheel, and a measured signal MS1 therefor is communicated via a line L1 to the central control means RV2. Corresponding thereto, the exit velocity of the upset tube after departing the haul-off means AV2 of the output side is registered with the assistance of another velocity measuring means MR2, particularly a measuring wheel, and a measured signal MS2 therefor is sent via the line L2, likewise to the central control means RV2. The difference between the measured signals MS1, MS2 for the entry as well as exit velocity of the tube is determined in the control means RV2 and, dependent on the desired plastic shortening, i.e. excess length of the light waveguides, the corresponding setting of the haul-off velocities of the haul-off means AV1 or, respectively, AV2 of the input as well as output side is undertaken from this difference.

During the upsetting process, the metallic wall of the tube is supported from the outside by the supporting tube SRO extending essentially on a straight line, so that a radial escape of the tube RO7 from its essentially straight-line haul-off direction AZ2 is largely avoided. The supporting tube SRO advantageously supports the metallic wall of the tube radially toward the outside at least over the same length as the metallic wall is upset in the entire upsetting region STB. The supporting tube SRO can be advantageously arranged flush between the output of the haul-off means AV1 and the input of the haul-off means AV2.

It can also be potentially expedient to respectively allocate a separate control, particularly regulator means to each haul-off means AV1, AV2 instead of a central control means RV2. This is illustrated in FIG. 10 in that a separate regulator means RV1 for setting the haul-off velocity is additionally entered in dot-dashed lines for the haul-off means AV1.

The supporting tube SRO is advantageously dimensioned so that its wall thickness is adequate to resist the radial escape forces acting on it. To that end, in particular, it comprises a wall thickness between 1 and 5 mm, and preferably between 1 and 2 mm. The inside diameter of the tube SRO is preferably selected between 2 and 10% larger than the outside diameter of the upset metallic wall of the tube.

Figure 11:
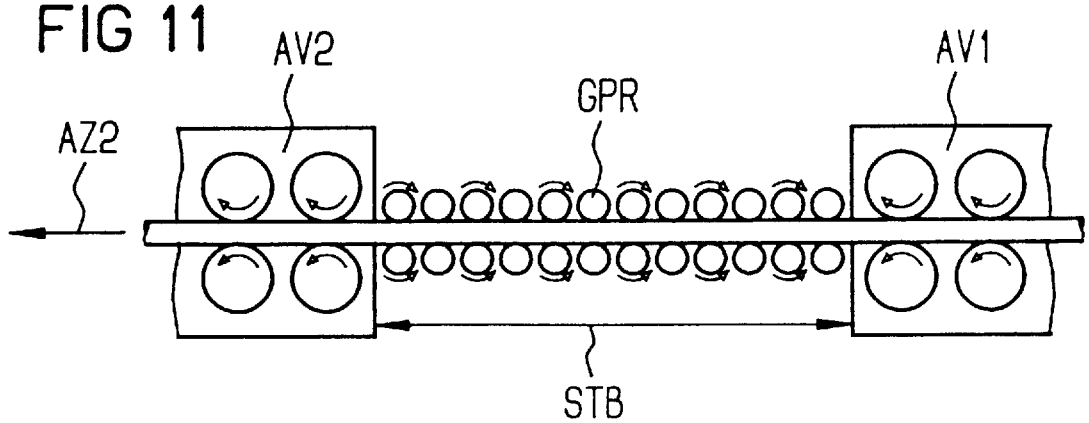
FIG. 11 is a schematic side view of a first embodiment of an upsetting device for the second sub-section of the production line of FIG. 9.

FIG. 11 shows an upsetting device modified compared to the device of FIG. 10 and, instead of the supporting tube SRO along the upsetting region STB, the device of FIG. 11 comprises a profiled roller path GPR between the haul-off means AV1 of the input side and the haul-off means AV2 of the output side and this path GPR extends essentially on a straight line in haul-off direction AZ2. The rollers of the roller path GPR are preferably rotatably suspended. In particular, they are respectively placed into rotation by the traversing tube RO5 itself. Rollers are thus provided along the upsetting path STB that press against the outside circumference of the traversing tube RO5, preferably at both sides of the longitudinal extent thereof. These rollers are thereby entrained in the running direction by the traversing tube RO5 and thus rotate. The rollers thereby support the tube from the outside so that a radial escape from the axial, particularly straight-line conveying direction AZ2 along the upsetting path STB is largely avoided or prevented. The profile roller path GPR is thus formed by a plurality of roller pairs that respectively enclose a through opening with a prescribable cross section for the traversing tube RO5. The respective roller is thereby fashioned approximately cylindrical, particularly circular-cylindrical.

Figure 13:
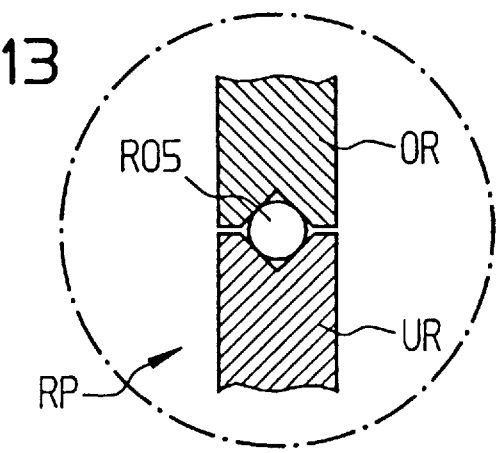
FIG. 13 is a partial cross sectional view through a roller pair used in the upsetting device of FIGS. 11 and 12.

In a schematic as well as enlarged cross sectional view, FIG. 13 illustrates how two rollers allocated to one another collaborate. The two rollers OR and UR have their outside surfaces partly rolling on themselves in an edge zone and partly rolling on the outside circumference of the traversing tube RO5. The rollers OR, UR are respectively allocated to one half of the outside circumference of the traversing tube. A respective recess or, respectively, running channel with a prescribable inside contour for accepting a sub-section of the outside circumference of the tube is preferably centrally formed into the outside edging surface of each of the two rollers OR, UR. These running channels are correspondingly fashioned relative to one another so that between them, the two rollers OR, UR in combination enclose a through opening with a prescribable cross section for the traversing tube RO5. In the cross sectional view of FIG. 13, the through opening of the running surfaces of the rollers OR, UR rolling off on one another is fashioned rhomboid-like. The tube RO5 is thus guided along between the two rollers OR, UR in the fashion of a running channel. The inside surfaces of these running channels thereby contact the tube RO5 at its outside circumference. In this way, a respectively defined guide path is forced on the tube RO5 by the respective roller pair, i.e. by the largely fit-shaped guidance of the tube RO5 in the through opening between the two running surfaces of the rollers OR, UR rolling off on one another, and what one must largely avoids is that the tube RO5 radially escapes during the upsetting event with reference to the central axis of this through opening. Since, moreover, the two rotating surfaces of the rollers OR, UR residing above one another and rolling off on one another can roll off at the outside circumference of the traversing tube RO5, an especially low-fiction traversal of the tube RO5 is assured.

In FIG. 11, a plurality of such roller pairs, which are shown in FIG. 13, are arranged following one another along the upsetting path STB along an imaginary straight line. Wear of the supporting means due to material abrasion is thus largely avoided. In particular, an adhesion, i.e. "seizing", of the tube RO5 in the supporting device is largely prevented. This is particularly important during the manufacturer of aluminum tubes equipped with light waveguides. The profile roller path GPR of FIG. 11 thus advantageously comprises a longer service life compared to the upsetting tube SRO of FIG. 10.

The respective roller preferably comprises an outside diameter between 10 and 50 mm, and preferably between 15 and 25 mm. The distance from one roller pair to the next is selected optimally small in order to be able to offer an optimally continuous, gap-free, lateral, particularly radial support for the traversing tube over the entire upsetting path STB. In particular, between 5 and 20, and preferably between 8 and 12, roller pairs are provided along the upsetting region STB.

Of course, it can also be potentially expedient to combine more than two rollers per longitudinal location or position to form a guide element all around the outside circumference of the tube RO5.

Figure 12:
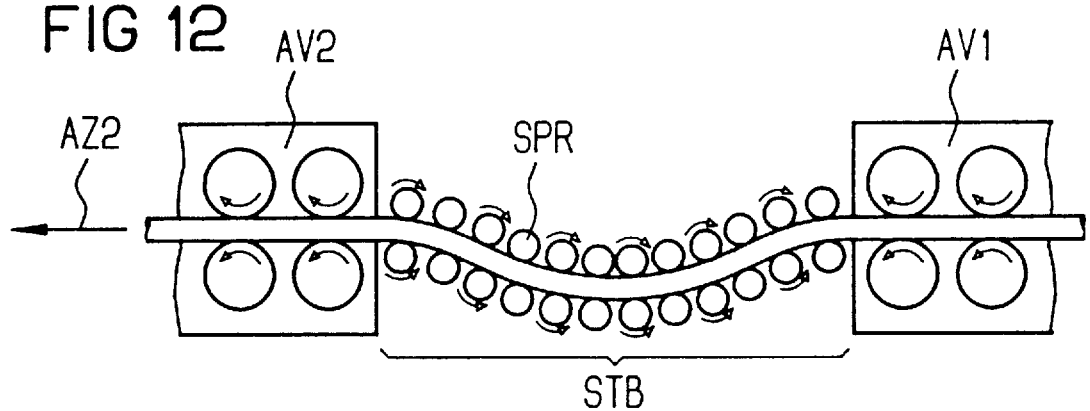
FIG. 12 is a schematic side view of a second embodiment of an upsetting device for the second sub-section of the production line of FIG. 9.

It can also be potentially expedient to provide a curved or, respectively, arcuately proceeding roller path SPR with rollers corresponding to FIGS. 11 and 13 between the two haul-off devices AV1, AV2, for example, in the upsetting region STB, as schematically illustrated in FIG. 12. This roller path SPR preferably proceeds S-shaped or sinusoidally. As a result thereof, the traversing tube is additionally charged with a curvature both at its upper side as well as at its lower side. When, for example, the tube traverses a roller path with a right-hand or convex curve, then it is additionally upset at that side that is allocated to the farther inwardly lying curvature path of the curvature. When, by contrast, the tube is pulled through a roller path with a left-hand or concave curvature, then it is additionally upset at the opposite side. Compared to the roller path GPR of FIG. 11, which proceeds on a straight line, the roller path SPR of FIG. 12, which proceeds on a curved path, promotes a more improved plastic upsetting of the metallic cladding RO5 because an additional upsetting force is exerted by the curvature. As a result of this additional measure, in particular, the upsetting force to be exerted by the two haul-offs AV1, AV2 (see FIG. 10) can be reduced by a considerable extent.

Due to the durable shortening of the metallic tube in the plastic region, finally, the light waveguides in the finished optical transmission element OE (see FIG. 2 or 3) are seated with radial excursions, particularly helically, dependent on the excess length that has been set. While the upsetting principle is applied to the metallic tube, an excess length up to 2% can be produced for the light waveguides.

Of course, it is also possible to combine the upsetting process of the production line of FIG. 8 with the thermal lengthening device of the production line of FIG. 1. Such a combination particularly enables the setting of especially great excess length for the light waveguides.

Figure 14:
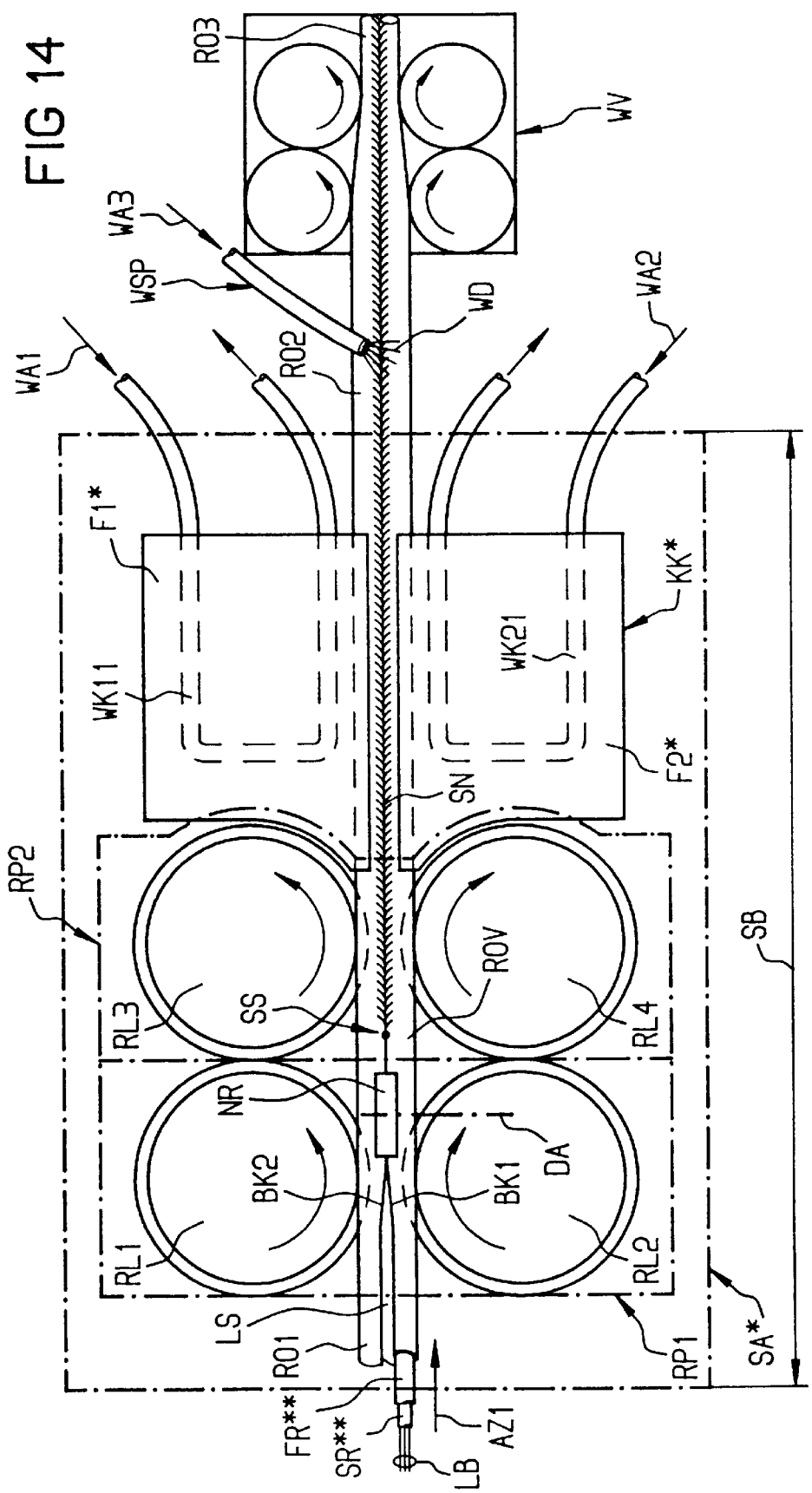
FIG. 14 is a schematic plan view of an embodiment of the inventive welding arrangement for the production line for the manufacturing of light waveguides equipped with metal tubes, particularly the production line shown in FIGS. 8 and 9.

FIG. 14 illustrates the welding arrangement SA* of FIG. 8 in detail and in a plan view. As viewed in the haul-off direction AZ1, the longitudinally slotted tube RO1 is conducted through at least two rollers or running wheels RL1, RL2 allocated to one another in the input zone of the welding region SB. The two rollers RL1, RL2 are thereby arranged at both sides of the longitudinal extent of the traversing tube RO1 and, in particular, reside correspondingly opposite one another offset by exactly 180° insofar as possible. They are preferably rotatably suspended and are placed in rotation, in particular, by the tube RO1 passing therethrough on a straight line. In particular, they are suspended so that the rotational motion can ensue in an essentially horizontal plane, for example, their axes reside perpendicular to the plane of the drawing of FIG. 14. The rollers RL1 and RL2 roll off at the outside circumference of the longitudinally slotted tube RO1 passing through between them with the rolling off at both sides of the longitudinal slot LS thereof, and thus the rollers RL1, RL2 press the two band edges BK1, BK2 of the tube together, so that these are placed optimally abutted and the longitudinal slot LS largely disappears. In order to also simultaneously impress or, respectively, force a defined cross sectional shape onto the essentially circular-cylindrically fashioned longitudinally slotted tube RO1 for the actual welding process, the two rollers RL1, RL2 allocated to one another trans-axially, particularly perpendicularly with respect to the straight-line longitudinal extent of the tube RO1 form a roller pair RP1 that comprises a through opening with a prescribable cross section for the traversing tube RO1. For shaping the tube RO1, corresponding profiled running channels or, respectively, grooves are formed in at the outside circumference of the two rotating wheels or rollers RL1, RL2. The inside contour of the respective running channel thereby preferably corresponds to the desired outside contour of that section of the outside circumference of the tube RO1 that is allocated to the respective roller RL1, RL2. In particular, each roller RL1, RL2 is approximately allocated to one sub-half of the outside circumference of the tube RO1 at both sides of the longitudinal slot LS thereof. The region around the longitudinal slot LS1 viewed in haul-off direction AZ1 thereby remains freely accessible in order to be able to subsequently weld the two band edges BK1, BK2. The profiling of the outer surface of the respective running roller RL1, RL2 is respectively schematically indicated with the assistance of two concentric circles in FIG. 14 for a better illustration.

Figure 16:
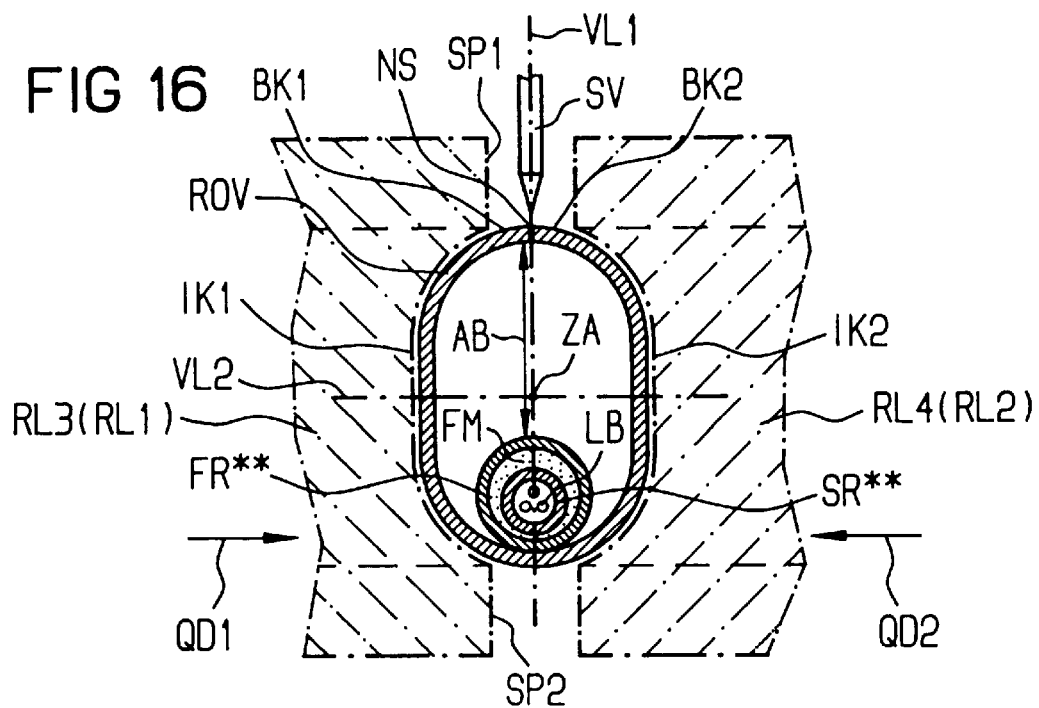
FIG. 16 is a schematic cross sectional view in the welding region of the actual welding point of the device of FIGS. 14 and 15.

FIG. 16 shows a schematic cross section taken in the direction of the haul-off direction AZ1 of the metallic tube when passing between the two rollers RL1, RL2 of FIG. 14. The two rollers RL1, RL2 are thereby indicated dot-dashed in FIG. 16. In addition, an imaginary connecting line VL1 is entered as a dot-dashed line in FIG. 16, and this line proceeds through the middle of the abutting region of the two band edges BK1, BK2 at the upper side of the tube and through a location offset thereto by approximately 180° at the outside circumference of the tube, i.e. at the underside of the tube. The two rollers RL1, RL2 are respectively allocated to a sub-half of the outside circumference of the tube at both sides of this imaginary symmetry or, respectively, connecting line VL1 that proceeds vertically through the center ZA of the tube in FIG. 16. The rollers RL1 and RL2 are arranged to lie opposite one another at the outside circumference of the traversing tube with the imaginary connecting line VL2 of their centers indicated by a dot-dashed line in their recesses IK1, IK2, which line VL2 proceeds perpendicular to the imaginary connecting line VL1 in the cross sectional view of FIG. 16. Whereas the abutting region of the band edges BK1, BK2 is approximately allocated to the 12 o'clock position at the outside circumference of the tube and lies on top, the middles of the recesses IK1, IK2 are offset by about 90° thereto. The inside contours of the recesses IK1, IK2 are respectively preferably formed into the inside of the appertaining rollers RL1, RL2 so that the roller pair RP1 prescribes a through opening with a prescribable cross section, particularly an elliptical or, respectively, highly oval cross section, for the traversing tube. A longitudinal gap SP1 or, respectively, SP2 that extends along the imaginary connecting line VL1 thereby remains between the two rollers RL1, RL2 both at the upper side as well as at the underside of the tube. The two band edges BK1, BK2, which are to be welded to one another, remain outwardly freely accessible for the welding process along the longitudinal gap SP1. When the initially essentially circular-cylindrical tube RO1 is introduced into the passage between the two rollers RL1, RL2, then the two rollers RL1, RL2 exert a pressure force trans-axially onto the outside walls of the tube with respect to the longitudinal extent of the tube passing through in the haul-off direction AZ1. The transverse pressing thereby occurs on any plane that lies approximately perpendicularly relative to the longitudinal extent of the tube RO1 and whose privileged direction (viewed in the cross section of FIG. 16) proceeds, in particular, through the center ZA of the tube RO1 as well as essentially parallel to the imaginary connecting line for the band edges BK1, BK2 and, for example, approximately parallel to that tangent that proceeds approximately through the abutting location in the middle between the two band edges BK1, BK2 at the outside circumference of the tube RO1. In the cross sectional view of FIG. 16, this privileged direction for the transverse pressure forces is indicated with the assistance of a dot-dash straight line VL2 that is entered essentially horizontally therein. As a result of the transverse pressing, a tube joining gap pressure is generated for the longitudinally slotted tube RO1 so that the band edges BK1, BK2 thereof residing opposite one another are pressed together, so that they abut one another optimally flush and the longitudinal slot LS is closed. What this means in other words is that the longitudinally slotted tube is pressed together with a privileged force direction along the imaginary connecting line VL2, and these forces are being indicated by the arrows QD1, QD2 directed toward one another. Since the two rollers RL1, RL2 squeeze or, respectively, upset the two sub-halves of the tube together at both sides of the symmetry line VL1, a highly oval, oblong cross sectional shape occurs for the tube. This is referenced ROV in FIG. 16. Since the two rollers RL1, RL2 of the two sub-halves of the outside circumference of the tube pressed together at both sides of the longitudinal slot LS, the tube is pinched together or, respectively, upset together at both sides of the imaginary connecting line VL1, so that an oblong cross sectional shape occurs for the tube, i.e. the two rollers RL1, RL2 simultaneously also act as shaping blocks. By the transverse pressing, these effect a plastic deformation of the tube so that it comprises a greater extent along the imaginary connecting line VL1 than along the imaginary connecting line VL2, for example, in other words, that the tube is shaped higher than wide. After the transverse pressing, the two rollers RL1, RL2 have their running grooves or, respectively, recesses IK1, IK2 lying against the outside circumference of the traversing tube essentially with a positive lock.

After the originally approximately circular-cylindrical longitudinally slotted tube RO1 of FIG. 14 has been reshaped into a highly oval form with the assistance of the roller pair RP1 and the band edges BK1, BK2 thereof have been placed in abutment, the tube is subsequently pressed flat in the region of the band edges BK1, BK2 before the actual welding location SS of the welding region SB. A height norming or positioning roller NR is provided as reshaping means for this purpose. This height norming roller is preferably rotatably suspended in the haul-off direction AZ1. To that end, its rotational axis DA in the plan view of FIG. 14 extends essentially perpendicular to the longitudinal extent of the tube RO1 passing through in the haul-off direction AZ1. The roller NR is placed in rotation by the tube passing through on a straight line. The roller NR presses from above onto the band edges BK1, BK2 so that the band edges BK1, BK2 of the traversing tube RO1 are pressed flat, i.e. pressed planar, and thus come to lie in a common planar positional plane. This positional plane, in particular, lies parallel to that tangent that proceeds approximately through the abutting location in the middle between the two band edges BK1, BK2 at the outside circumference of the originally circular-cylindrical tube RO1. What this means in other words is that the positional plane of the band edges BK1, BK2 that have been pressed flat extends essentially parallel to the imaginary connecting line VL2 that proceeds horizontally in FIG. 16. In this way, the two band edges BK1, BK2 that are placed in abutment, for example, they largely touch one another and are assigned a defined positional plane.

In this way, it becomes possible to pass the two band edges BK1, BK2 through the welding arrangement SA* under the following welding device SV, which may be a laser, in an exact radial spacing with reference to the central axis of the tube. This is schematically illustrated in longitudinal section in FIG. 15. The band edges BK1, BK2 are melted at the actual welding location SS with the assistance of the welding device SV. FIG. 16 shows this again schematically in cross section. The two band edges BK1, BK2 of the highly ovally shaped tube ROV are abutted in a common, plane-faced positional plane, i.e. they are placed flush against one another and optimally touch one another. The highly oval tube ROV thus comprises a plane-faced indentation in the region of its band edges BK1, BK2 that was previously effected by the norming roller NR. What can be achieved in this way is that, as viewed in radial direction with reference to the central axis ZA of the tube ROV, a defined spacing can be observed between the abutting line of the two band edges BK1, BK2 and the welding device SV. This allows a welding of the band edges BK1, BK2 in an especially precise, controllable way. In that the abutting line between the two band edges BK1, BK2 that proceeds essentially on a straight line thereby lies at the top upon passage through the welding arrangement SA* of FIG. 14, for example at the upper side of the tube ROV, and also lies in a plane-faced, particularly essentially horizontally proceeding plane, molten metal, which is the molten material of the band edges BK1, BK2 at the welding location SS (see FIG. 14), is largely prevented from running down on the outside circumference of the tube ROV. Material losses in the region of the band edges and an inadmissible reduction in wall thickness along the weld SN are largely avoided in this way.

It can be potentially expedient to also arrange at least one analogously fashioned roller pair following the weld location in addition to or independently of the roller pair RP1 or, respectively, potentially several roller pairs preceding the actual welding location SS (in the direction of view in throughput direction AZ1). In FIG. 14, the highly oval tube ROV is conducted through another roller pair RP2 after the welding in the welding location SS viewed in the haul-off direction AZ1. The rollers RL3, RL4 thereof are preferably arranged in fashioned in conformity with the roller pair RP1. The roller pair RP1 preceding as well as the roller pair RP2 immediately after the actual welding location SS particularly serves the purpose of preventing the band edges of the highly oval tube ROV from springing apart, i.e. from moving away from one another, as long as the molten material of the weld SN has not yet solidified, i.e. cooled and hardened. To that end, a transverse pressing power is exerted onto the two band edges at both sides of the abutting line proceeding on a straight line in the haul-off direction AZ1. The band edges placed in abutment can no longer migrate apart due to this lateral guidance before the solidification of the molten material of the weld SN, i.e. before a firm mechanical connection has formed between the band edges. The weld SN remains freely accessible toward the outside between the two rollers RL3, RL4. As a result thereof, a molten material of the weld SN is advantageously largely prevented from being abraded when passing through the welding arrangement SA* or from being disturbed or even damaged in some other inadmissible way. The welded tube ROV thus does not have the weld SN itself coming into contact with the two rollers RL3, RL4. The molten material of the weld SN can thereby solidify largely uninfluenced.

It can also be potentially expedient to provide more than one roller pair, i.e. a plurality of roller pairs, corresponding to RP1, or, RP2 preceding and/or following the actual welding location.

Figure 15:
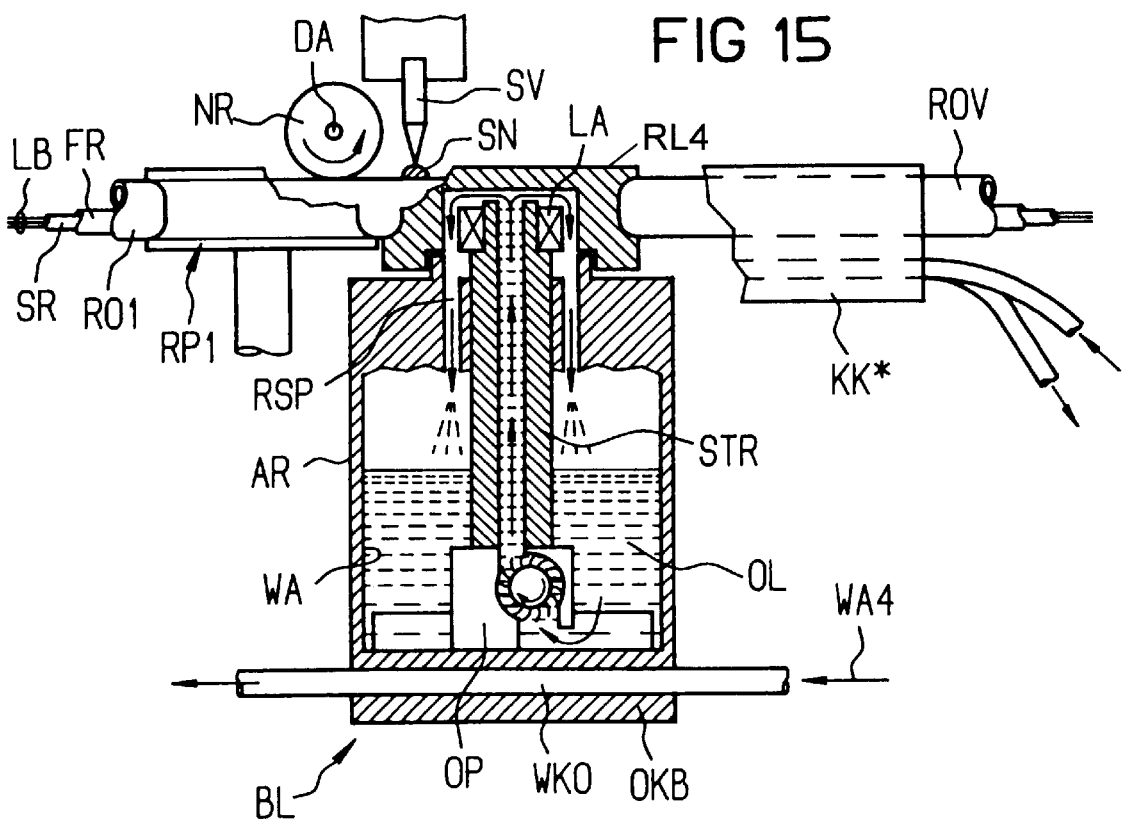
FIG. 15 is a schematic side view with portions broken away and portions in cross sectional of part of the welding arrangement of FIG. 14.

In order to largely avoid an overheating of the light waveguides guided in the supporting tube SR as well as of the filling compound FM in the filing tube FR, the two rollers RL3, RL4 of the roller pair RP2 are also fashioned as cooling members. Analogous thereto, the two rollers RL1, RL2 of the first roller pair RP1 can also assume a cooling function even before the actual welding location SS. The respective roller is cooled from the inside. The longitudinal section of FIG. 15 illustrates this by way of example for the roller RL4. The roller RL4 is mounted by a bearing LA on a stationary, longitudinally immobile bearing block BL so that the roller RL4 is rotatable in a plane perpendicular to the plane of the drawing of FIG. 15, i.e. in a horizontal attitudinal plane with reference to the base of the welding arrangement SA* of FIG. 14. A coolant OL, preferably oil, is pressed through a central standpipe or a tubular axle STR in the inside of the bearing block BL, and flows upward to the bearing LA, which is preferably a needle bearing. This bearing LA is attached to the free end of the standpipe STR. The coolant OL emerges from the output side of the tube end and is returned to a collecting basin or, respectively, a collecting trough WA by an annular gap channel RSP between the central standpipe STR and the outside pipe or, respectively, outside wall AR of the bearing block BL. The collecting basin WA is in communication with the pump OP. The outside wall AR of the bearing block BL thus surrounds the central standpipe STR, so that a closed coolant system is formed. As a result thereof that the coolant OL is conducted away immediately above the bearing LA in the annular gap channel RSP, it also simultaneously assumes a lubricating function for this bearing LA in the same cooling circulation. Preferably, a heat-bearing oil is therefore preferably employed as the coolant. The coolant OL itself is cooled in its trough WA in that cooling channels WKO are conducted through a floor OKB of the trough WA and a coolant, such as, for example, water WA4 passing through these cooling channels WKO.

Viewed in summary, thus, the heat in the immediate environment of the actual welding location SS can be quickly eliminated from the tube in that a cooled solid member presses against the outside circumference of the tube ROV at both sides of the weld SN. As a result thereof, the heat of the molten material can be kept largely away from the light waveguides and the filling compound surrounding them. The double arrangement of the two protective tubes SR, FR also contributes to this, the light waveguides as well as the filling compound being conducted past under the welding arrangement in these tube are respectively separated from one another. In addition, the highly oval shaping of the tube ROV contributes to this protection so that an optimally great spacing AB (see FIG. 16) can be offered between the weld SN and the protective tube system. If possible, the double arrangement of the two tubes SR, FR is thereby expediently conducted along an inside wall of the metallic tube ROV lying opposite the weld SN. It is also expedient to pre-shape the tube RO1 with an optimally large diameter.

An outside diameter between 3 and 12 mm, and preferably between 4 and 10 mm is expediently selected for the tube RO1. The tube RO1 preferably comprises an inside diameter of between 2.5 and 10 mm, preferably between 3.6 and 8 mm.

In that at least one roller, particularly a roller pair, is employed as the cooled solid member, inadmissibly high frictional forces between the metallic tube and the contacting surfaces of the rollers are also advantageously largely avoided. As a result thereof, a plucking at the tube or even an adhesion thereof, i.e. "seizing" of the tube, is largely opposed.

In order to prevent the tube from getting stuck in the respective roller pair, it can be particularly expedient to allocate a drive means, particularly a motor, to the respective roller, so that the tube can be actively pushed forward in the haul-off direction AZ1 between respectively two rollers.

In addition to or independently of the roller pairs RP1, RP2 of FIG. 14, it can be potentially expedient to finally arrange at least one additional, cooled solid member following the roller pair RP2. This cooled solid member is arranged in the zone of the welding region SB at the output side and is stationarily attached in space by contrast to the running rollers of the roller pairs RP1, RP2, and is suspended immobile and non-rotatable, unlike the rollers RL1/RL2, RL3/RL4. Such a cooled solid member follows the roller pair RP2 in FIG. 14 and is referenced KK*. The member KK* is formed by two separate, stationary cooling blocks F1*, F2* that enclose the tube ROV traversing in the haul-off direction AZ1 clamp-like from the outside between their long sides. The cooled solid member KK* is preferably fashioned in conformity with the cooling member KK of FIGS. 6, 7, and the two cooling blocks F1*, F2* comprise an approximately cuboid shape. A longitudinal passage or, respectively, through opening with a prescribable cross section for the traversing tube ROV is provided between these two stationary cooling blocks F1*, F2*. The cross sectional profile of this through opening preferably corresponds to the desired outside contour of the highly ovally shaped tube ROV. The two cooling blocks F1*, F2* press trans-axially onto the tube ROV, so that the inside walls press flush against the outside surface of the tube ROV and cool the tube wall thereof. A longitudinal gap or, respectively, longitudinal slot that likewise proceeds essentially on a straight line is kept free at the upper side of the cooling member KK* between its two cooling blocks F1*, F2*, and this longitudinal gap or longitudinal slot extends over the entire length of the cooling member KK*. The weld SN remains freely accessible along this longitudinal gap and can thus solidify without negative influences. In this way, the molten material of the weld SN is contacted neither with a cooling fluid nor in any other way when being pulled through the welding arrangement SA*, at least not until the molten material has solidified. The respective cooling member such as, for example, the rollers RL3, RL4 as well as the cooling blocks F1*, F2* have only a dry contacting surface lying against the outside tube wall, i.e. the tube is preferably pulled through the respective cooling members RP2 or, respectively, KK* in the dry condition. An embrittlement of the material or oxide formation along the formed weld SN is largely avoided in this way. If, by contrast thereto, cooling were carried out with a liquid coolant such as, for example, water at and/or following the actual welding location SN, then an undesired embrittlement of the material or other damage to the weld SN would usually occur. Since the weld SN is passed through the welding arrangement SA* essentially without contact at least until it has solidified, a disturbance of the molten melt bath as well as some other inadmissible abrasion of material of the as yet still soft weld is largely avoided.

Respective channels WK11, WK21 through which a coolant, for example, water is conducted, are formed into the two cooling blocks F1*, F2*. The respective cooling block F1*, F2* is preferably fashioned solid and respectively comprises an approximately cuboid shape.

The two cooling blocks F1*, F2* embrace the highly ovally shaped tube ROV corresponding to the two rollers RL1, RL2 of FIG. 16 as viewed in cross section. They contact at least 60% of the outside surface of the tube ROV and leave only between 5 and 20%, preferably about 10% of the outside circumference of the traversing metallic tube ROV free of contact.

At the same time, the two stationary cooling blocks F1*, F2* continue to press the tube ROV together on the conveying path away from the actual welding location SS, so that the band edges are prevented from springing apart until the molten material of the weld has solidified, i.e. has largely cooled. As a result of the two cooling blocks F1*, F2*, the two band edges BK1, BK2 are kept pressed together until a firm mechanical union between the two has been produced.

Viewed overall, at least respectively one cooled solid member is brought into contact with the traversing tube before, at the welding location itself and/or following the actual welding location in order to cool the tube as quickly as possible. The molten material of the weld itself thereby remains untouched, so that the weld can solidify largely uninfluenced. What is thus assured by this type of cooling is that no overheating or other thermal overstressing of the light waveguides and/or of the filling compound in the inside of the metallic tube occurs in the region of the welding location.

Compared to the stationarily arranged, immobile cooling member KK* of FIG. 14, the rollers RL3, RL4 of the roller pair RP2 are preferably distinguished in that they are seated freely rotatable and are entrained in rotating fashion by the tube traversing in the haul-off direction AZ1. This offers the advantages of reduced friction on the outside surface of the traversing tube as well as of a more precise guidance and shaping thereof.

A material with especially high thermal conductivity such as, for example, a metallic material, particularly aluminum bronze, copper bronze or steel, is expediently selected for the cooled solid bodies such as, for example, the rollers RL3, RL4 as well as the cooling blocks F1*, F2*. A material that comprises a high drive gliding property, i.e. is especially low in friction, is expediently employed for the respective cooling member so that a plucking or pulling at the tube or even a seizing, i.e. sticking of the tube, is largely avoided when being drawn through the respective cooling member.

It is especially expedient to provide cooling members corresponding to one another at both sides of the forming weld, these members comprise a longitudinal passage of a prescribable cross sectional shape that remains free between them. What this additionally enables is to force a desired cross sectional shape on the tube and to simultaneously guide the tube in a defined way. In this way, the tube can be conducted along the welding region SB on an essentially straight-line path. Lateral excursions, particularly radial excursions with reference to the central axis of the tube are thereby largely avoided during the welding process in the welding arrangement SA*. A very exact tube guidance along the welding region SB is enabled in this way. As a result thereof, the weld SN can be formed largely undisturbed, and preferably in a straight line along the abutting line of the two band edges BK1, BK2 of the tube. In particular, a running or scraping of the molten metal in the region of the band edges BK1, BK2 is largely avoided because the tube is conducted through the device with essentially a non-contacting of the weld over the entire welding region SWB of the welding arrangement SA*.

In particular, an essentially line-shaped weld that extends essentially on a straight line over the length of the finished tube can be produced with the assistance of the welding arrangement SA* of FIG. 14. The weld is thereby largely prevented from becoming too thin and the band edges or, respectively, the holes are prevented from being burned through.

The advantageous welding arrangement SA* of FIG. 14 can thereby be utilized in all possible versions of production lines with which metallic tubes equipped with light waveguides are fabricated.

The welding region SB preferably extends along a path between 50 and 200 mm, and preferably between 100 and 150 mm. The rollers each respectfully preferably comprise an outside diameter between 30 and 80 mm, and preferably between 30 and 50 mm. The roller pairs RP1 as well as RP2 preferably follow at a spacing between 40 and 90 mm, and preferably between 40 and 60 mm. The height norming roller NR is arranged offset following the roller pair RP1 by between 5 and 30 mm, and preferably between 10 and 20 mm in the haul-off direction AZ1. The actual welding location SS comprises a spacing between 15 and 60 mm, and preferably between 20 and 40 mm from the appertaining longitudinal location of the first roller pair RP1. The cooling blocks F1*, F2* preferably comprise a longitudinal extent of between 30 and 100 mm, particularly between 40 and 60 mm.

The nip between the two rollers RL1, RL2 as well as RL3, RL4 viewed in trans-axial direction is preferably selected between 1 and 6 mm, and preferably between 1 and 4 mm. The nip between the two cooling blocks F1*, F2* viewed in trans-axial direction is preferably selected between 1 and 6 mm, and preferably between 1 and 4 mm.

After the solidification of the molten bath of the weld SN, it can be potentially expedient to additionally spray the as yet white-hot weld SN with a fluid coolant, particularly drops of water, after leaving the cooling member KK*. To that end, a cooling means WSP follows the welding arrangement SA* of FIG. 14. It particularly serves for wetting or, respectively, spraying the already solidified weld SN with a coolant fluid, preferably with microscopically small drops of water. Only after the solidification of the molten material of the weld SN, the tube is itself cooled to such an extent that the outside surface of the weld SN returns to the starting color. A formation of an oxide layer on the weld is thereby advantageously opposed. Finally, the highly ovally shaped tube ROV is conveyed through a following shaping mechanism, preferably a rolling and/or drawing means, and is lent the final form. The oval tube ROV is preferably reshaped into a circular-cylindrical tube that is reduced in diameter compared to the oval cross sectional shape. The rolling means WV thereby preferably corresponds to the rolling means corresponding to FIGS. 1, 2.

In this way, it becomes possible with a production line according to FIG. 8 to weld light waveguides in a thin metal tube protected against mechanical and chemical influences so that the waveguides are loosely seated stress-free under all possible operating conditions. To that end, the light waveguides are introduced in the metallic tube with a defined excess length, preferably helically, during the application process. Such metal tubes equipped with light waveguides are particularly suitable for integration into high-voltage cables, preferably high-voltage conduction cables, submarine cables on other electrical and/or optical power and/or communication cables of which higher demands are made with respect to the mechanical loadability.

The finished optical transmission element OE comprises an outside diameter of between 0.5 and 10 mm, and preferably between 1.5 and 8 mm. Its inside diameter preferably lies between 0.3 and 9 mm, and preferably between 1.3 and 7 mm.

Although various minor modifications may be suggested by those versed in the art, it should be understood that I wish to embody within the scope of the patent granted hereon all such modifications as reasonably and properly come within the scope of my contribution to the art.

I claim:

1. A method of manufacturing a metal tube in which at least one light waveguide is introduced, said method comprising the steps of preshaping an elongated metal band moving in a haul-off direction into a tubular shape with two edges of the band adjacent each other, welding the two edges of the tubular-shaped metal band to one another in a welding region to form a welded metal tube with a longitudinal weld extending in said haul-off direction, introducing at least one light waveguide into the welded metal tube and, while welding the two edges, contacting the metal tube on an outside on both sides of the weld with a dry surface of at least one cooling member while maintaining the two edges accessible.

2. A method according to claim 1, wherein the step of shaping the metal band comprises shaping the band into a tube having a highly oval cross section.

3. A method according to claim 1, wherein the step of introducing the at least one light waveguide includes inserting a filling compound into the tube before shaping the welded tube and before inserting each of the light waveguides, wherein the light waveguides that are inserted last in said tube are entrained in a haul-off direction by the filling compound.

4. A method according to claim 1, wherein the tubular-shaped metal band is contacted in the welding region by the cooling member which shapes the tubular-shaped metal band to a predetermined cross sectional shape in the welding region.

5. A method according to claim 1, wherein the step of contacting the tube with a cooling member comprises contacting an outside circumference of the tube by at least one roller.

6. A method according to claim 1, wherein an excess length of the at least one light waveguide in the metal tube is produced by shaping the welded tube to a desired cross section before introducing the light waveguides into the tube, then heating the shaped tube and elastically stretching the tube immediately following the step of shaping, and then cooling the elastically stretched tube and allowing the tube to relax back to the original shortened length so that the light waveguides come to lie in the shortened metal tube with a defined excess length.

7. A method according to claim 1, wherein the step of preshaping the moving elongated metal band comprises pressing the edges of the metal band flat in a region before the welding location of the welding region.

8. A method according to claim 1, which includes providing an excess length for the at least one light waveguide compared to the metal tube enclosing the light waveguide by plastically shorting the metal tube in an axial direction along a prescribed upsetting path after the welding region by supporting the outside surface of the tube in a longitudinal prescribable upsetting path by contacting the tube by a plurality of outside rollers on both sides of the longitudinal extent so that a radial escape of the tube in an axially conveyed direction along the upsetting path is limited.

9. A method according to claim 1, which includes shaping of the cross section of the tube by rolling the tube subsequent to the welding of the edges of the band together.

10. An apparatus for manufacturing a metal tube into which at least one light waveguide is introduced, said apparatus including means for shaping an elongated metal band moving in a haul-off direction into a tube with two edges of the band adjacent each other, means for welding the two edges of the tube-shaped metal band together in a welding region to form a welded tube with a longitudinal weld extending in said haul-off direction of the moving tube, means for introducing the light waveguides into said welded tube, and at least one cooling member being provided in said welding region for contacting the tube on an outside surface at both sides of the weld with a dry contacting surface which cools the welded tube as it passes through in the haul-off direction, said cooling member having a longitudinal slot extending in the haul-off direction so that the longitudinal weld of the tube is freely accessible.

11. An apparatus according to claim 10, which includes an elongated filling tube for delivering a filling compound into the welded tube proceeding from the input side of the means for shaping.

12. An apparatus according to claim 10, wherein the means for introducing at least one waveguide introduces the waveguide into a completely shaped tube includes a support tube extending into the welded tube from an input region of the means for shaping.

13. An apparatus according to claim 10, which includes means for thermally shielding the light waveguides being provided on the inside of the welded tube at least in the welding region.

14. An apparatus according to claim 10, wherein the cooling member is formed by at least two stationary cooling blocks, and means for pressing the blocks transaxially relative to the longitudinal extent of the tube with the blocks enclosing the tube therebetween.

15. An apparatus according to claim 10, wherein the cooling member is formed by at least one roller, said roller rolling off an outside circumference of the transversing tube.

16. An apparatus according to claim 10, wherein the cooled solid member opposes the band edges of the tube from springing apart during the solidification of the molten metal of the weld being provided on both sides of the weld of the tube.

17. An apparatus according to claim 10, which includes additional means for shaping the cross sectional shape of the welded tube including rollers being positioned to follow the means for welding.

18. An apparatus according to claim 10, wherein the means for introducing the light waveguide is located adjacent an output end of the means for shaping so that the light waveguide is introduced at least during the operation of the means for shaping, said apparatus including a lengthening device immediately following the means for shaping and including means for heating the shaped tube and means for elastically stretching the shaped tube as it departs the means for shaping, relaxation means being arranged following the lengthening device, said relaxation means having means for allowing cooling of the tube departing the lengthening device so that the relaxation of the elastic stretching causes a shortening of the tube and an excess in the length of the light waveguides disposed within the tube for a defined excess length.

19. An apparatus according to claim 10, which includes means for pressing the edges of the band flat before the band reaches the means for welding.

20. An apparatus according to claim 19, wherein the means for pressing are formed by at least one roller that presses against the traversing tube under pressure in an abutting region of the band edges.

21. An apparatus according to claim 10, which includes means for plastically upsetting and axially shortening the metal tube passing therethrough, said means for upsetting comprising rollers along a prescribed upsetting path that roll off on both sides of the longitudinal extent of the transversing tube on the outside circumference thereof and support the tube from the outside so that a radial escape from an axially conveyed direction along the upsetting path is largely prevented.

22. An apparatus according to claim 10, wherein the cooling member includes inside passages for a flowing coolant so that welding heat from the contacting surface is continually removed.

23. An apparatus for manufacturing a metal tube into which at least one light waveguide is introduced, said apparatus including means for shaping an elongated metal band moving in a haul-off direction into a tubular-shaped band with two edges of the band adjacent each other, means for welding the two edges of the tubular-shaped band together in a welding region to form a welded metal tube with a longitudinal weld extending in said haul-off direction, means for introducing the light waveguides into said welded metal tube, the means for shaping having at least one solid member being provided in said welding region for contacting the tube on an outside surface at both sides of the weld as the tube passes through in the haul-off direction, said solid member having a longitudinal slot extending along the weld in the haul-off direction to provide free access to the weld and the solid member opposing the band edges of the tube from springing apart during solidification of the molten metal of the weld.

* * * * *